United States Patent
Spiecker et al.

(10) Patent No.: US 12,352,941 B2
(45) Date of Patent: Jul. 8, 2025

(54) LIGHT SHEET MICROSCOPE WITH LINE FOCUS

(71) Applicant: LaVision BioTec GmbH, Bielefeld (DE)

(72) Inventors: Heinrich Spiecker, Bielefeld (DE); Martin Schuette, Bielefeld (DE)

(73) Assignee: Miltenyi Biotec B.V. & Co. KG, Bergisch Gladback (DE)

( * ) Notice: Subject to any disclaimer, the term of this patent is extended or adjusted under 35 U.S.C. 154(b) by 978 days.

(21) Appl. No.: 17/290,762

(22) PCT Filed: Dec. 10, 2019

(86) PCT No.: PCT/EP2019/084324
§ 371 (c)(1),
(2) Date: May 2, 2021

(87) PCT Pub. No.: WO2020/126640
PCT Pub. Date: Jun. 25, 2020

(65) Prior Publication Data
US 2022/0003979 A1 Jan. 6, 2022

Related U.S. Application Data

(60) Provisional application No. 62/868,917, filed on Jun. 30, 2019, provisional application No. 62/783,231, filed on Dec. 21, 2018.

(51) Int. Cl.
G02B 21/00 (2006.01)
G01N 21/64 (2006.01)
(Continued)

(52) U.S. Cl.
CPC ..... *G02B 21/0032* (2013.01); *G02B 21/0048* (2013.01); *G02B 21/006* (2013.01);
(Continued)

(58) Field of Classification Search
CPC ............ G02B 21/0032; G02B 21/0048; G02B 21/006; G02B 21/0072; G02B 21/0076; G02B 21/0008; G02B 21/26; G02B 21/33; G02B 21/34; G02B 21/367; G02B 21/02; G02B 21/248; G02B 21/32; G02B 21/008;
(Continued)

(56) References Cited

U.S. PATENT DOCUMENTS

2010/0177381 A1* 7/2010 Lippert .................. G02B 21/26
359/398
2011/0115895 A1* 5/2011 Huisken ................. G02B 21/06
359/385
(Continued)

FOREIGN PATENT DOCUMENTS

DE 10 2005 0270 77 5/2006
DE 10 2013 002 981 8/2014
(Continued)

*Primary Examiner* — Jyotsna V Dabbi
(74) *Attorney, Agent, or Firm* — Jaquelin K. Spong

(57) ABSTRACT

A light sheet microscope for imaging biological materials uses a plurality of light beams, focused to an overlapping line to excite a fluorescent material within the biological sample. The laser-induced fluorescence image is then analyzed and displayed.

17 Claims, 27 Drawing Sheets

(51) Int. Cl.
   *G02B 21/26*     (2006.01)
   *G02B 21/33*     (2006.01)
   *G02B 21/34*     (2006.01)
   *G02B 21/36*     (2006.01)
   *H04N 23/55*     (2023.01)
(52) U.S. Cl.
   CPC ..... *G02B 21/0072* (2013.01); *G02B 21/0076* (2013.01); *G02B 21/008* (2013.01); *G02B 21/26* (2013.01); *G02B 21/33* (2013.01); *G02B 21/34* (2013.01); *G02B 21/367* (2013.01); *H04N 23/55* (2023.01); *G01N 21/6458* (2013.01); *G01N 2201/1047* (2013.01)
(58) Field of Classification Search
   CPC ..... G01N 2201/1047; G01N 2201/103; G01N 2201/1035; G01N 2201/104; G01N 2201/1042
   USPC .......................................................... 359/391
   See application file for complete search history.

(56)           References Cited

U.S. PATENT DOCUMENTS

2015/0253560 A1\* 9/2015 Otte .................. G02B 21/0032
                                                        359/385
2019/0317312 A1\* 10/2019 Hillman ............... G02B 21/367
2021/0018408 A1\* 1/2021 Dobosz .................... G01N 1/34

FOREIGN PATENT DOCUMENTS

EP         3 088 933 A1    11/2016
WO     WO 2010/014244 A2    2/2019

\* cited by examiner

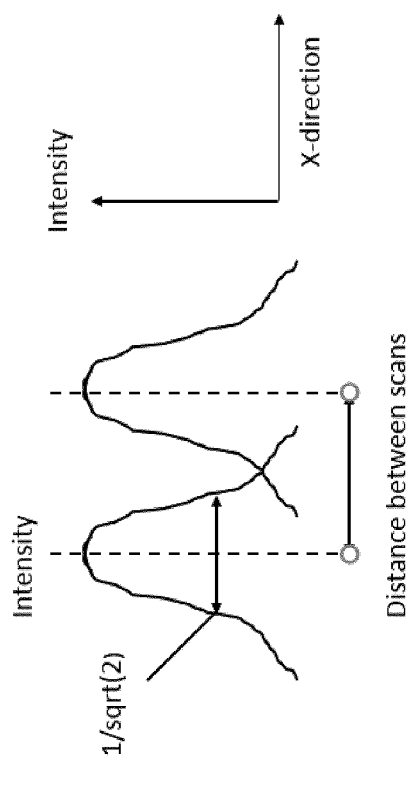
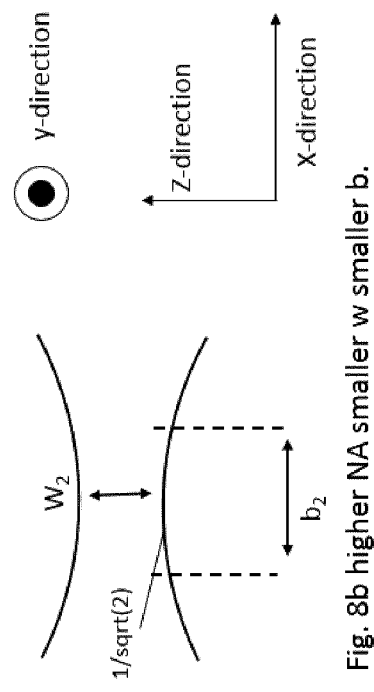
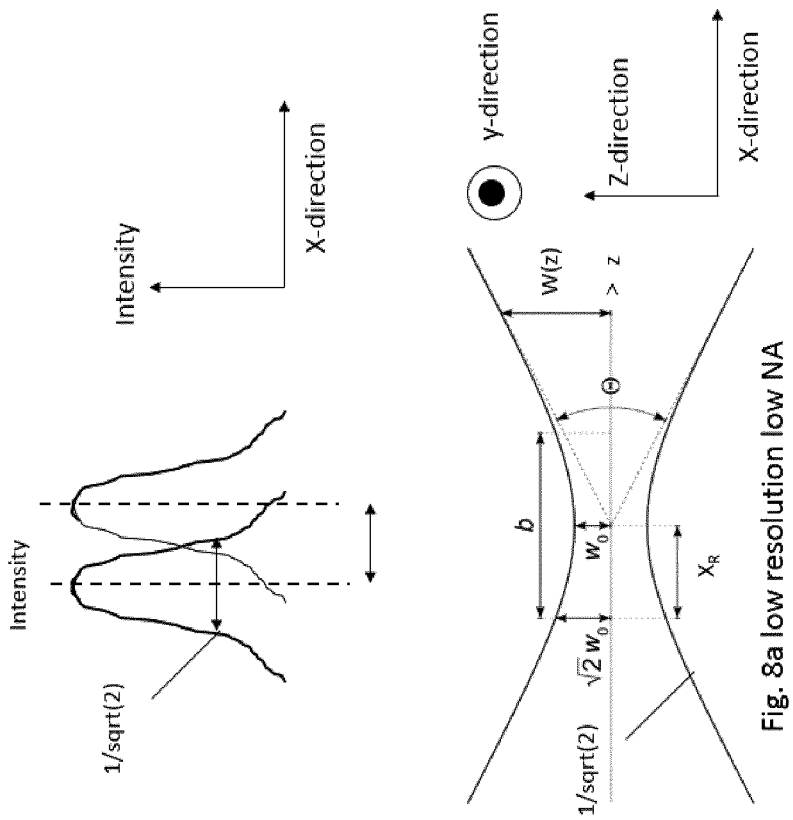
Fig. 8a low resolution low NA
Fig. 8b higher NA smaller w smaller b.

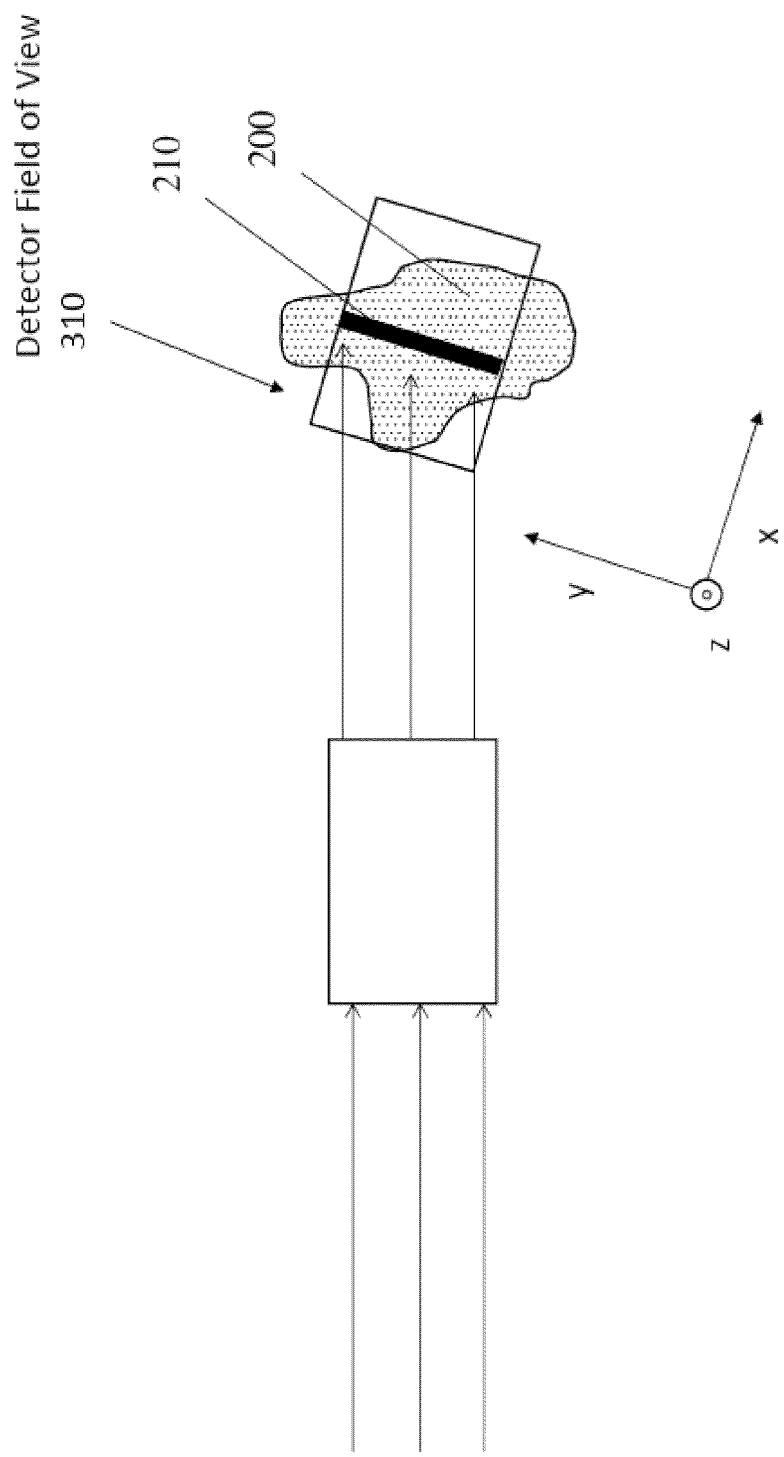
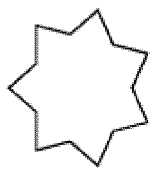
Fig. 13

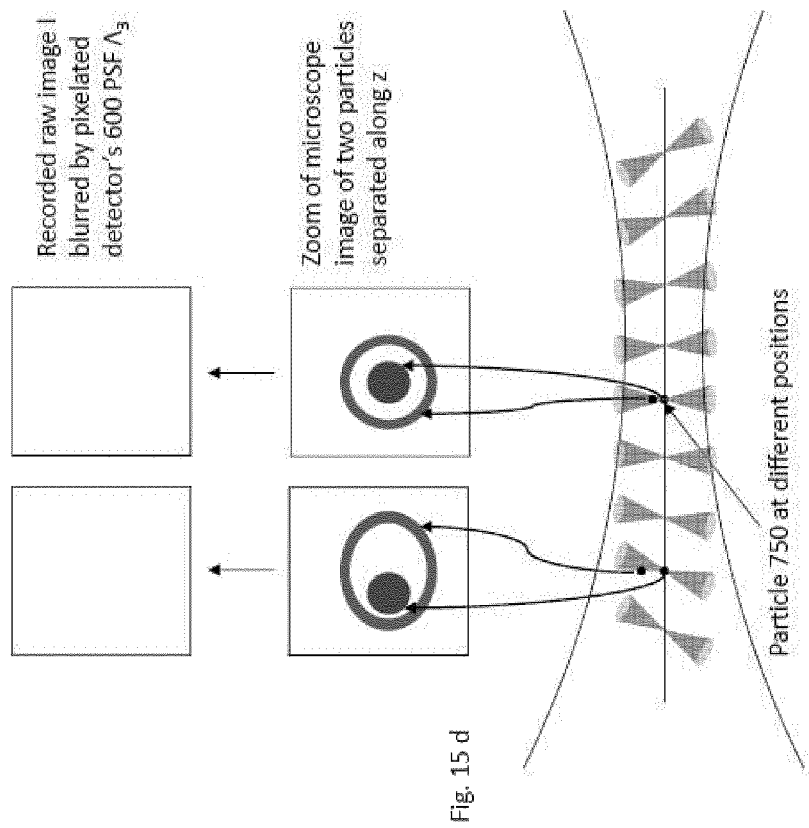
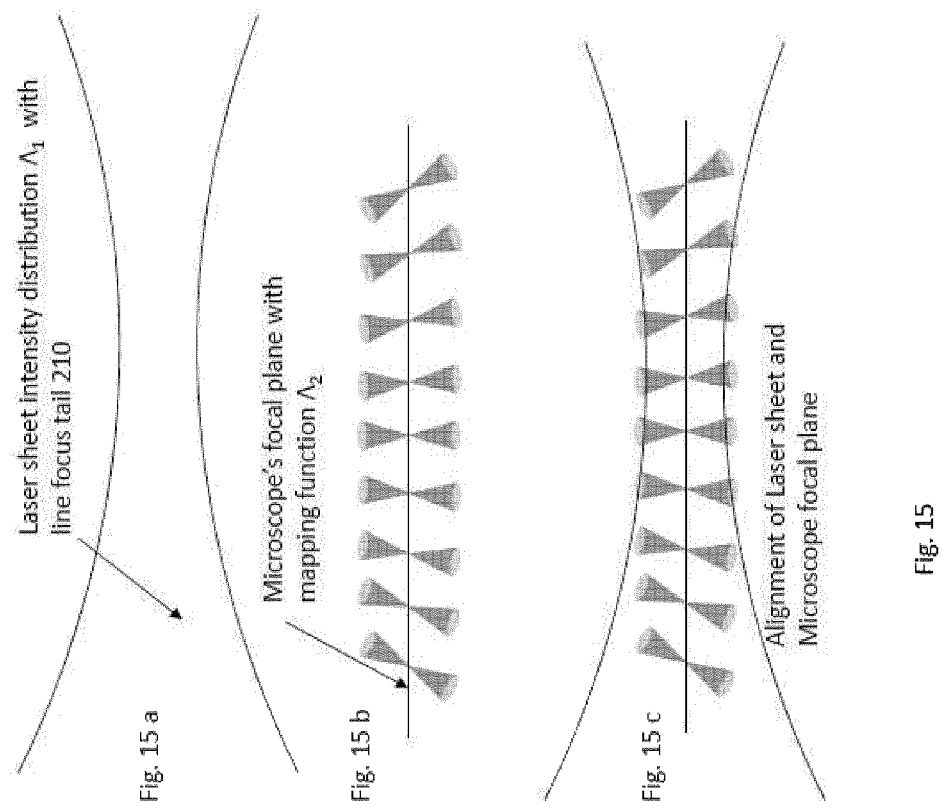
Fig. 15

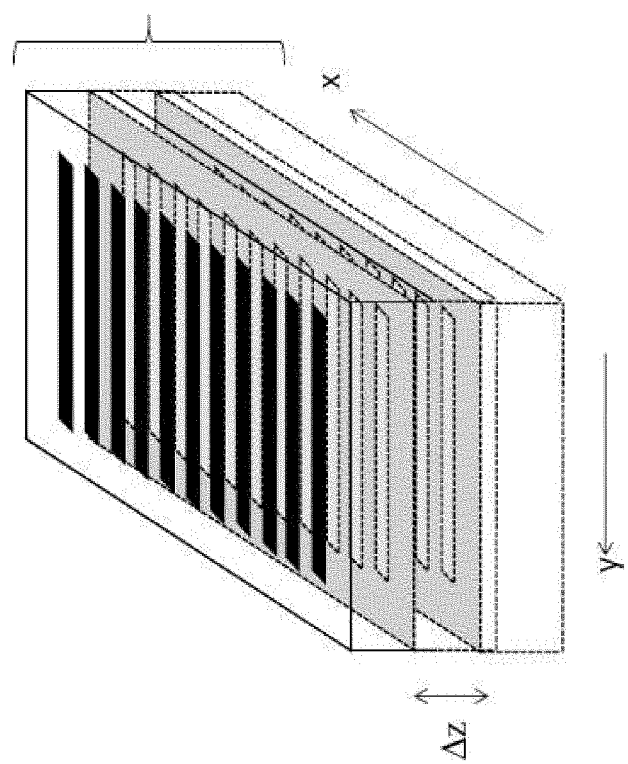
Fig. 18b
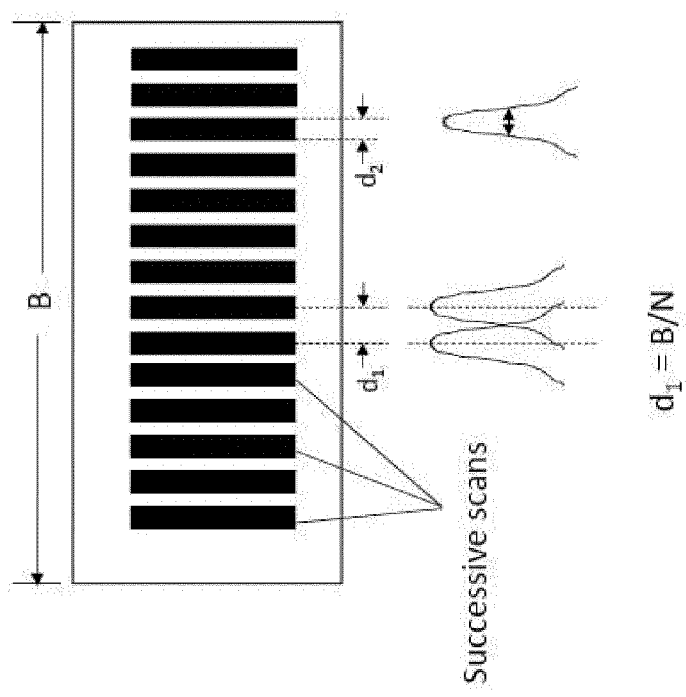
Fig. 18a
Fig. 18

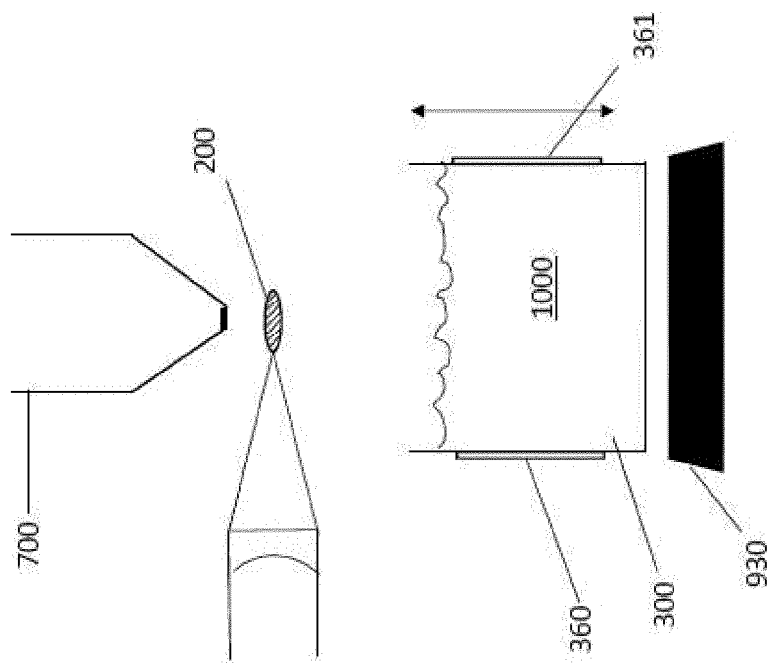
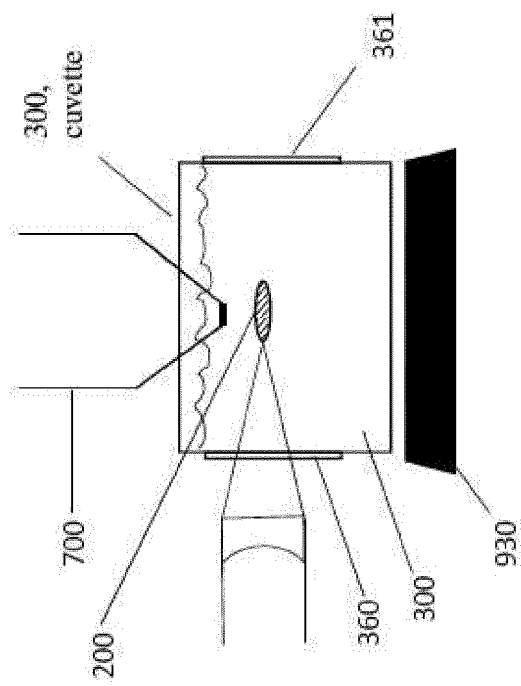
Fig. 24
Fig. 24a
Fig. 24b

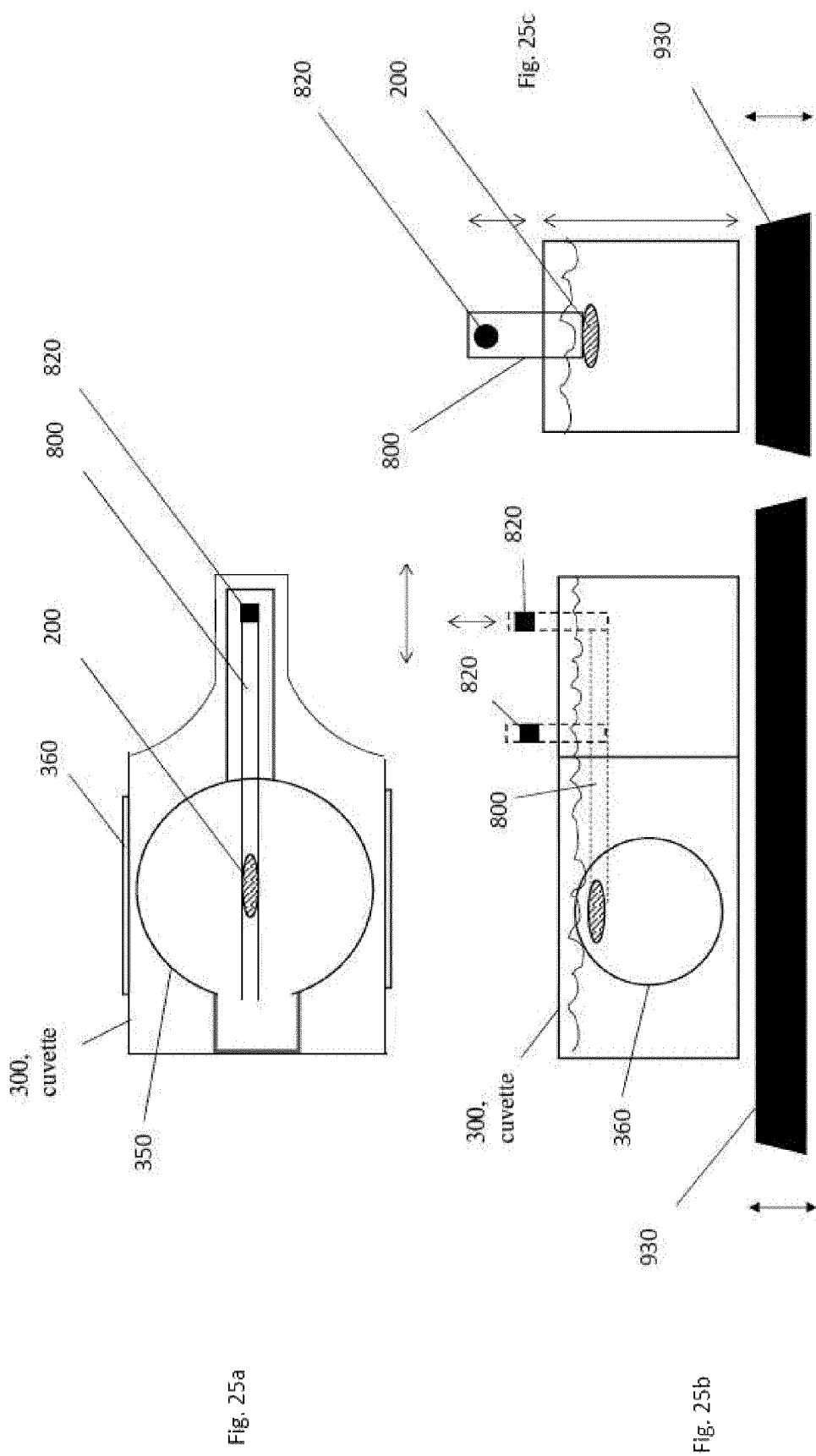

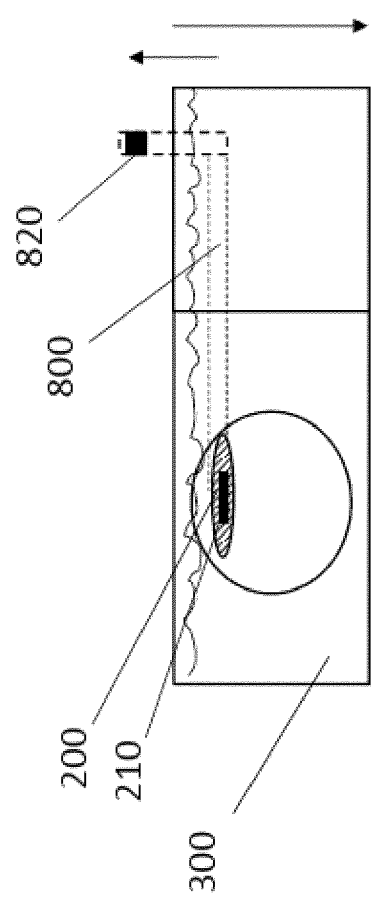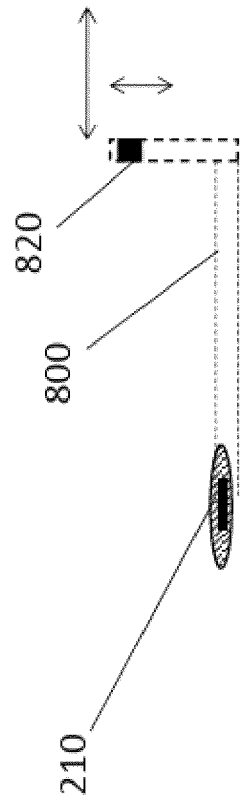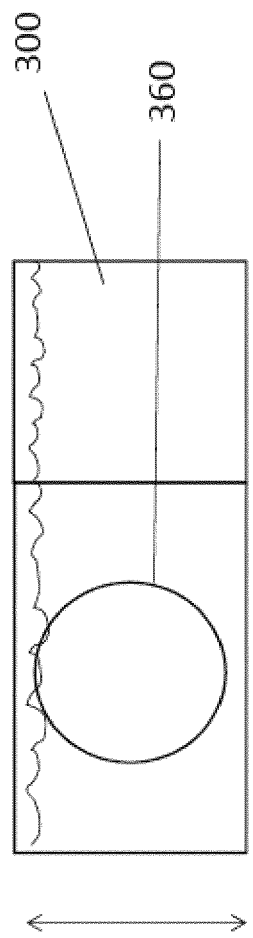
Fig. 26a
Fig. 26b

LIGHT SHEET MICROSCOPE WITH LINE FOCUS

CROSS REFERENCE TO RELATED APPLICATIONS

The PCT application claims priority to U.S. Provisional Application Ser. No. 62/783,231, filed Dec. 21, 2018 and U.S. Provisional Application Ser. No. 62/786,917, filed Jun. 30, 2018. Each of these prior applications is incrporated by reference in its entirety.

STATEMENT REGARDING FEDERALLY SPONSORED RESEARCH

Not applicable.

STATEMENT REGARDING MICROFICHE APPENDIX

Not applicable.

BACKGROUND

This invention relates to a system for imaging biological samples.

Imaging systems exist that use laser induced fluorescence to image biological samples.

Some of these systems can generate images of subsurface structures with impressive clarity, precision and resolution.

Some of these systems employ F-theta scanning mechanisms, which scan a single focused laser into the sample using a rapidly moving mirror. Because the speed of the mirror movement directly determines the image acquisition speed, these systems are limited in the speed with which data can be acquired, which limits the time scale of effects they are able to capture. Also, the moving mirror has significant mechanical complexity, which adds cost and makes and makes high resolution problematic.

Accordingly, what is needed is a microscope which images biological samples in three dimensions with excellent resolution, contrast and accuracy with few moving parts, and no high speed moving parts, that is cost effective and easy to use.

SUMMARY

An object of this invention is a microscope which has an enhanced ability to precisely image internal, sub-surface structures, or structures disposed in the bulk of a sample.

An object of this invention is a microscope which is able to remove noise in a measured image to obtain a corrected image by error correction.

An object of this invention is to create three-dimensional images by scanning a light sheet laterally across a sample, and then orthogonally through the depth.

An object of this invention is a microscope which can have the sample changed without affecting the excitation or detection optics.

An object of this invention is a microscope which can have the objective lens change without affecting the excitation optics.

An object of this invention is a microscope wherein the sample can be withdrawn from the clearing fluid without touching the sample or affecting the excitation or detection optics.

An object of this invention is a microscope which images biological samples in three dimensions with excellent resolution, contrast and accuracy with few moving parts, and no high speed moving parts.

A light sheet microscope for imaging biological samples is described. In a first embodiment, the microscope may include at least two collimated light sources each emitting a beam of light along at least two different propagation axes, at least two optical subassemblies which focus the at least two beams of light into at least two straight lines, wherein at least one of the two straight lines defines a non-orthogonal angle with respect to its propagation axis and wherein the at least two straight lines are substantially overlapping, and wherein the straight lines and the propagation axes define an excitation plane of the light sheet microscope.

In another embodiment, a light sheet microscope for imaging a biological sample is described, which may include at least one light source focused by an optical assembly to a single line focus illuminating the biological sample, defining an excitation with an intensity distribution function $\Lambda_1$. The excitation may cause the biological sample to emit fluorescence. The microscope may also include a means to move the single line focus, wherein the single line focus remains in the object sided focal plane of the microscope, and thereby illuminating a plurality of laterally adjacent positions in the biological sample. The microscope may further include an imaging system that generates a two-dimensional image of the three-dimensional biological sample employing a mapping function $\Lambda_2$, and a pixelated detector. The pixelated detector may convert the two-dimensional images of the microscope of the fluorescence emitted by the sample to at least two raw images, wherein the pixelated detector has a point spread function $\Lambda_3$, and a computer that can store and manipulate the signals produced by the pixelated detector and is programmed to produce a restored pixelated image F from the raw images I by removing degradations associated with the functions $\Lambda_1$, $\Lambda_2$ and $\Lambda_3$.

In other embodiments, a light sheet microscope for imaging a first biological sample disposed on a sample holder is disclosed. In this embodiment, the microscope may include an imaging lens structure including an operative objective lens having a focal plane and at least one inoperative lens, and wherein the imaging lens structure is movable in a z-direction orthogonal to the focal plane by a movable first stage. The microscope may further include a container holding a quantity of fluid, wherein the sample holder is immersible in the fluid, and a detector which forms an image of the focal plane, wherein the image includes at least a portion of the first biological sample. The movable first stage supporting the lens structure may have sufficient range of motion to submerge the operative objective lens into the fluid held in the container, thereby forming an image of the first biological sample on the detector, and wherein the sample holder. The container may have a shape which admits a movement of the imaging lens structure, when the imaging lens structure is submerged.

In yet other embodiments, a light sheet microscope for imaging a biological sample, located on a sample holder is disclosed. The microscope may include a detector which forms an image of the biological sample through imaging optics, wherein the biological sample disposed in a focal plane of the imaging optics. The microscope may further include a container holding a quantity of fluid and disposed on a movable first stage, movable in the z-direction, wherein the z-direction is orthogonal to the focal plane, a sample holder holding the biological sample. Within this embodiment, the biological sample may be immersed in the fluid and the biological sample may be in the focal plane, wherein the first stage has a range of motion such that the sample can be both immersed in the fluid and in the focal plane and then withdrawn from the fluid by the motion of the first stage, wherein the first stage moves the container independently of the sample holder, the imaging optics and the detector.

These and other features and advantages are described in, or are apparent from, the following detailed description and accompanying drawings.

BRIEF DESCRIPTION OF THE DRAWINGS

Various exemplary details are described with reference to the following figures, wherein:

FIG. 8a is an illustration of the intensity of the line focus as a function of lateral distance, and an illustration of the beam waist and Rayleigh distance for a first numerical aperture $NA_1$; FIG. 8b is an illustration of the intensity of the line focus as a function of lateral distance, and an illustration of the beam waist and Rayleigh distance for a second numerical aperture $NA_2$, wherein $NA_1<NA_2$;

FIG. 13 is an illustration of a light sheet microscope with a pixelated detector imaging a sample within its field of view of the detector;

FIG. 15 portrays the different steps (FIG. 15a, FIG. 15b, FIG. 15c, FIG. 15d) of image formation;

FIG. 18 is an illustration showing horizontal scans (FIG. 18a, x-dimensions) and scanning in depth (FIG. 18b, z-dimension) to produce a three dimensional image by the light sheet microscope from the biological sample

FIG. 24 is an illustration showing a view of how the cuvette may be immersed by vertical movement, (FIG. 24a) independently of the sample and the optical system (FIG. 24b);

FIG. 25a plan view showing the movable cuvette; FIG. 25b is a cross sectional view, and FIG. 25c is an end-on view how the cuvette and sample holder may be moved vertically independently of the sample and the optical system;

FIG. 26a is a side view illustration showing how the sample may be accessed without disturbing the rest of the optical system; FIG. 26b shows the sample completely withdrawn from the clearing fluid;

It should be understood that the drawings are not necessarily to scale, and that like numbers may refer to like features.

DETAILED DESCRIPTION

Figure 1:
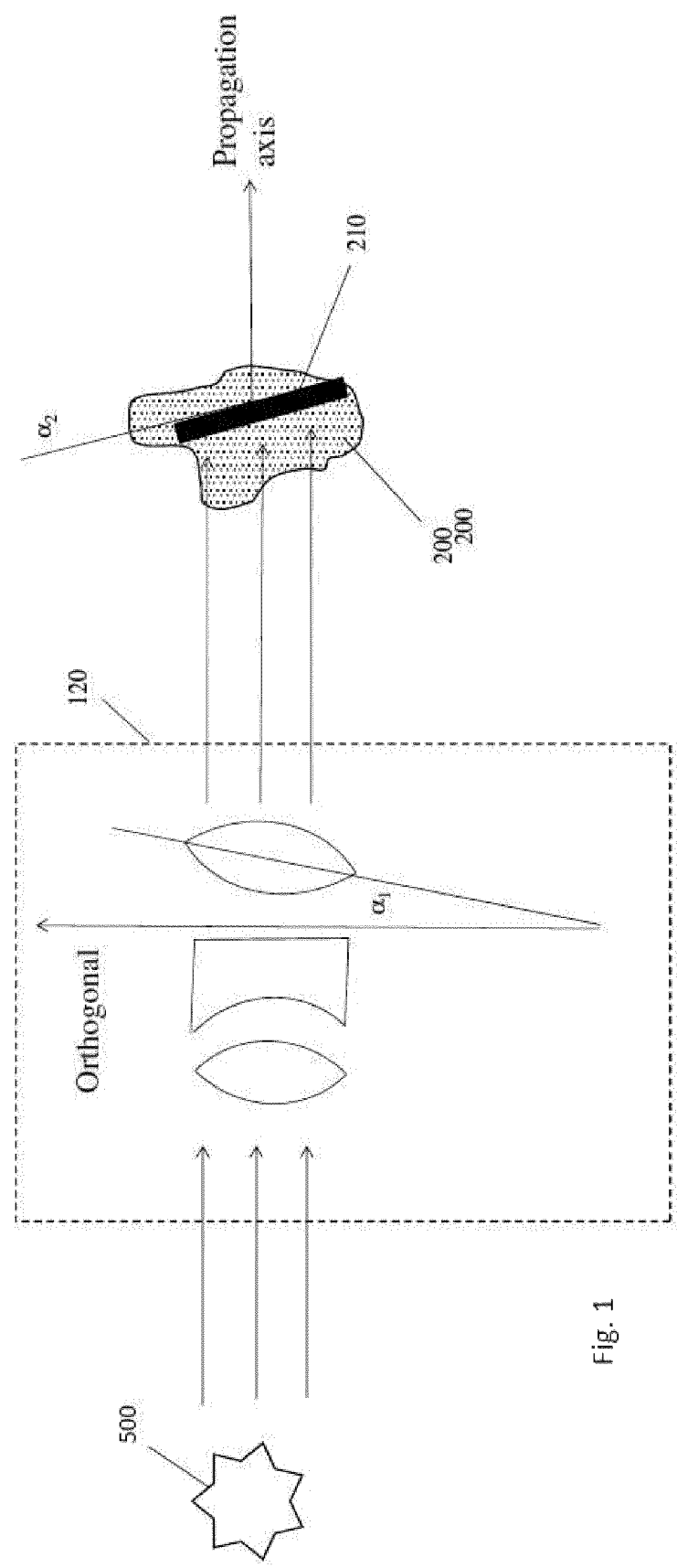
FIG. 1 is an illustration of a line focus in a biological imaging device, wherein the line focus is tilted with respect to an axis of propagation of radiation.

The first portion of this description is directed to the optical details of the novel optical imaging device for biological samples using light sheets, and error correction. The device also has some design features that make it remarkably simple and easy to use. The novel imaging device may reduce the uncertainly deriving from the shadows cast by opaque structures, and also has no high speed moving parts and so may be considerably simpler than other scanning methodologies. The second portion discusses the error correction methodology used to improve the image data in terms of accuracy, contrast and resolution. The third portion describes some of the novel mechanical features of the light sheet microscope that make it particularly advantageous and easy to use.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The following reference numbers are used to refer to the following features. It should be understood that this list is provided as a convenience, and may not be exhaustive of the reference numbers used in the text that follows.

- 10 Lens turret
- 60 Turning mirrors including 61, 62 and 63
- 61, 62, 63 Turning mirrors embodiment 100
- 68, 64, 66, 74 Turning mirrors in alternative embodiment
- 65, 67, 69 Turning mirrors embodiment 101
- 74 First turning mirrors embodiment 100, 101
- 51 rotating aperture including slot 73 and aperture 52
- 68, 69 turning mirrors
- 70 telescoping lens
- 73 slot
- 100 Movable optical assembly
- 101 Alternative embodiment of optical system
- 100' Adjacent side movable optical assembly
- 120 Line focusing optical subassembly #1
- 140 Line focusing optical subassembly #2
- 160 Line focusing optical subassembly #3
- 200 Biological sample
- 210 Line focus/focal plane
- 300 Cuvette
- 310 Field of view of detector
- 350 Top surface opening for objective lens
- 351, 352 Cutouts from cuvette 300
- 360, 361 Transparent windows for admitting radiation to the cuvette and sample
- 400 Controller
- 500 light source
- 521-526 Laser sources
- 530 Collimating lens
- 550 Filter wheel excitation
- 560 collimator
- 600 Detector
- 660 Filter wheel detector
- 620 imaging lens
- 660 detection filter
- 700 objective lens
- 750 particle
- 670 objective lens
- 800 sample holder
- 810 sample stage
- 820 sample stage support point
- 930 movable cuvette stage
- 900 stage for movable optical assembly
- 951, 952 Cutouts from cuvette 300
- 1000 clearing fluid A coordinate system applies to the figures in general. The x-axis is generally the scanning dimension, that is, it is the axis along which the line focus will be scanned. The y-axis is generally the direction of the line focus, that is, it is the direction that the focus lies along, with relatively uniform intensity within and along the focal line. The radiation beams entering the sample are traveling along an x-axis in the x, y plane. The z-axis is generally the viewing direction. That is, the optical axis of the camera and/or detector will lie above and orthogonal to the x-y-plane, along the z-axis.

In one aspect, the light sheet microscope may make use of Scheimpflug optics, which is the phenomenon whereby tilting an optical element with respect to its optical axis, the focusing properties of that element may be tilted as well. By careful placement and relative orientations, three excitation light sources may be arranged to create a single line focus that can then be scanned across the sample.

Accordingly, at least one optical element may be tilted with respect to propagation direction by an angle of <>90 degrees (non-orthogonal). When the angle $\alpha_1$ is defined relative to the line orthogonal to the propagation axis (see FIG. 1), the angle $\alpha_1$ may be less than 30 degrees preferentially, more preferably less than 20 degrees and more preferably about 16 degrees. As discussed below, this angle may be corrected for refraction effects occurring at the liquid cuvette holder boundary. This results in a tilt of the line focus with respect to the axis of propagation through the optical system by and angle $\alpha_1$. $\alpha_2$ may be similar in magnitude but in the opposite sense as $\alpha_1$.

According to one aspect of the invention, using the light sheet microscope as described herein, shadows cast by a particle are reduced or at least rendered unambiguous. Even more precision may be obtained using the error correction process described herein. In this process, a number of distinct shadows, which are switchable in this case by switching illumination sources, can be easily calculated out compared to a scanned beam, which creates one smooth shadow.

According to another aspect of the invention, a column of pixels can be treated in generally the same way in the image processing algorithm, because illumination in this dimension is uniform because of the properties of the line focus.

According to another aspect of the invention, very high precision three dimensional images may be produced using very few moving parts, and no high speed moving parts. This greatly improves repeatability, cost and reliability.

Light Sheet Microscope

FIG. 1 is an illustration of a line focus used in a biological imaging device, wherein the imaging device uses a single collimated light source 500. Radiation from the source 500 is focused into a line focus that is tilted with respect to an axis of propagation of radiation. Optical radiation from a source 500 is shaped by an optical subassembly 120, and focused into a line 210 that falls within a biological sample 200, but is tilted with respect to the axis of propagation through the optical subassembly 120.

The optical subassembly 120 may contain a plurality of optical elements, including for example two confocal or spherical lenses and a cylindrical lens. At least one of the lens elements may be tilted with respect to the axis of propagation of the radiation. The tilt angle is denoted by $\alpha_1$ wherein $\alpha_1$ may be in the range $0<\alpha_1<40°$, and more typically in the range $5<\alpha_1<25°$, and more preferably about 16°. This tilt may result in the line focus being tilted by a similar angle $\alpha_2$ with respect to the propagation axis of the radiation. The propagation axis or the axis of propagation is the direction traveled by photons at or near the center of the beam of collimated light. The optical axis is often the same or parallel to the propagation axis but is defined as the neutral axis of optical elements: the line passing through the center of curvature of lens and parallel to the axis of symmetry is the optical axis. The optical axis of the pixelated detector, for example, is the line from a first lens or transparent window on the front of the camera or detector, to the pixelated detector array at the rear of the camera or detector. These angles are defined relative to the axis orthogonal to the axis of propagation as shown in FIG. 1.

In the embodiment shown in FIG. 1, the second confocal lens (the third optical element in optical subassembly 120) may be tilted by the angle with respect to axis of propagation. The angle it forms, $\alpha_1$, is measured relative to the orthogonal direction with respect to this propagation axis. As a result of this tilt, the line focus 210 is also tilted by an angle $\alpha_2$ with respect to this orthogonal axis. Based on the geometry shown in FIG. 1, $\alpha_1$ may be similar in magnitude but opposite in sign with respect to this orthogonal axis. This is the basis of Scheimpflug optics. The Scheimpflug principle is a geometric rule that describes the orientation of the plane of focus of an optical system (such as a camera) when the lens plane is not parallel to the image plane. This principle is used here to form overlapping lines in an biological sample, as described in detail below.

The elements of the optical subassembly 120 may be arranged in a number of different ways, such as cylindrical/spherical/spherical or spherical/spherical/cylindrical. However, the configuration of spherical/cylindrical/spherical (shown in FIG. 1) may result in the most compact arrangement.

Within the optical subassembly 120, two lenses may be glued together. Scheimpflug conditions can also be realized with more and glued elements. However the configuration shown in FIG. 1 may be most advantageous for both Scheimpflug and curvature correction. Separate lenses also give an additional degree of freedom, because the distance of separation may affect the shape of the line focus and its curvature.

Figure 2:
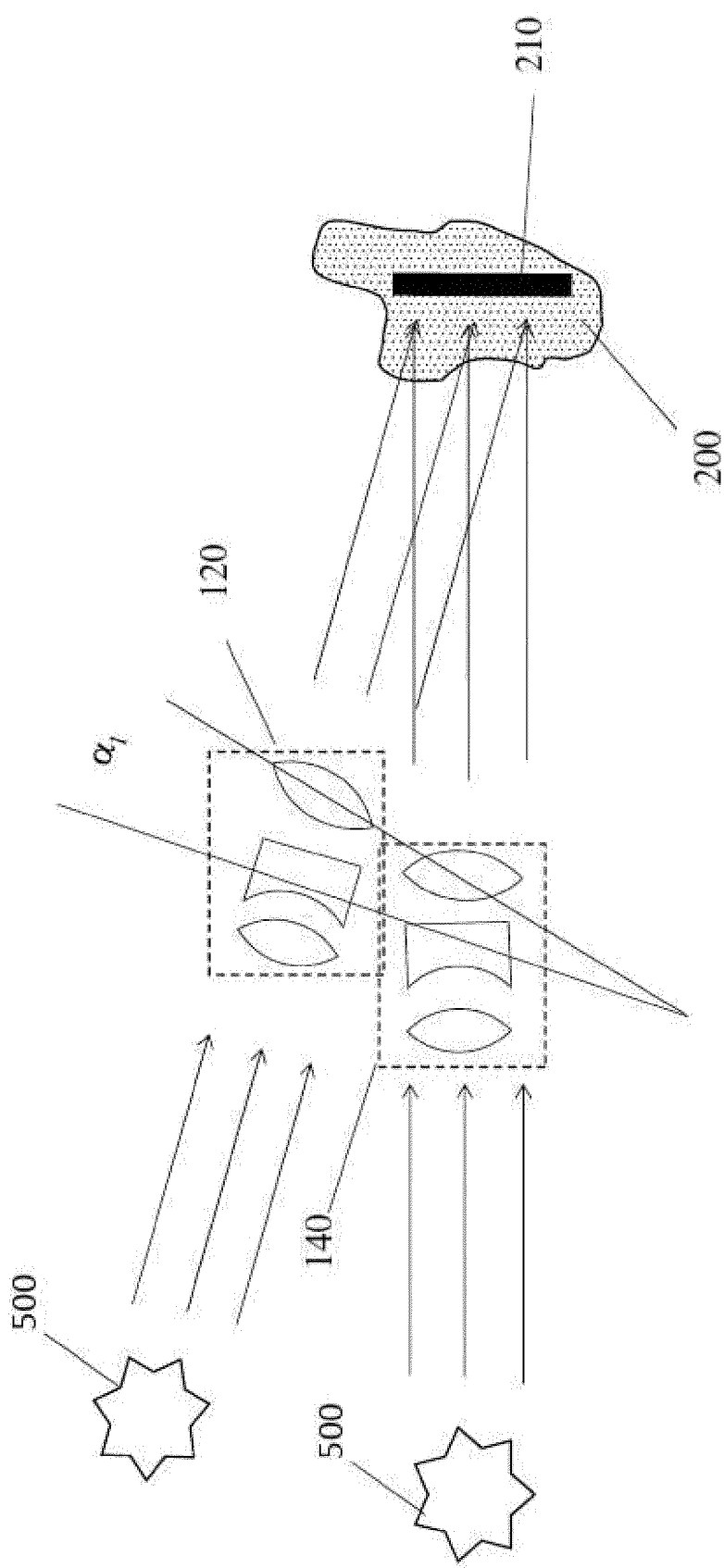
FIG. 2 is an illustration of a two overlapping line foci in a biological imaging device with two axes of propagation of radiation.

FIG. 2 is an illustration of another embodiment of two optical subassemblies 120 and 140. The components of the optical subassemblies may be similar or identical, each containing for example, two confocal lenses and a cylindrical lens. The arrangement of these components may be similar to that illustrated in the embodiment shown in FIG. 1. However this is exemplary only and the optical assembly may have different components or may they may be in a different arrangement or order.

The second optical subassembly 140 may also create a line focus, however this optical assembly may not have a tilted element. Accordingly, the line focus may not be tilted with respect to the image plane, but may instead lie nearly exactly along the orthogonal direction, that is, it may lie in the image plane.

It should be noted that optical subassembly 120 may be tilted with respect to optical subassembly 140. In other words, the optical axis and of optical subassembly 120 may form an angle with respect to the optical subassembly 140, and the propagation axis of the light traveling through it. Additionally, optical subassembly 120 may form a line focus at an angle with respect to its optical axis, and the propagation axis of the light traveling through it. By proper arrangement of the components of optical subassembly 120 and optical subassembly 140, the line focus caused by optical subassembly 120 may fall substantially exactly over the line focus resulting from optical subassembly 140. These overlapping line foci may be applied to a biological sample within a biological imaging device with two axes of propagation of radiation.

By "substantially overlapping" or "substantially exactly overlapping", it should be understood that the line foci deviate in overlap from one another by less than a defined amount. This amount may be in lateral misregistration or angular deviation. That is, the line foci although substantially exactly overlapping, may nonetheless deviate a finite amount laterally and angularly. The amount of lateral deviation allowed while still "substantially overlapping" or "substantially exactly overlapping", may be defined in terms of Rayleigh length. The amount of angular deviation may be defined in terms of degrees of angular deviation. For the purposes of this description, "substantially overlapping," the overlapping line foci will deviate from one another by less than 4 Rayleigh lengths laterally and less than 5 degrees angularly. More preferably, the "substantially overlapping" line foci will deviate from one another by less than 2 Rayleigh lengths and 3 degrees. Yet more preferably, "substantially overlapping" or "substantially exactly overlapping", overlapping foci may deviate from one another by less than 1 Rayleigh length and less than 2 degrees.

"Partially overlapping" may be understood to mean the placement of one line focus within 5 Rayleigh lengths of the adjacent line focus.

The biological sample 200 may have biological structures which are tagged with a fluorescent moiety. Accordingly, biological sample 200 may fluoresce when radiation from source 500 having the proper wavelength excites these fluorescent moieties. This fluorescence may be detected by an appropriate detector and used to gain information about the biological sample. The device is described in detail below.

Importantly, therefore, the device shown in FIG. 2 may use light 500 coming from multiple directions. The different directions may each derive from an independent light source, or they may use the same light source but split off the single source by partially transmitting and partially reflecting surfaces. These configurations are also described in further detail below.

Having radiation coming from different directions but with overlapping line foci may have several advantages. One advantage may be that shadows cast by an opaque structure intercepting light from one source may be distinguished from other sources of contrast. Accordingly, the contrast seen in an image may be attributed to an obscuring structure, and the detailed morphology of that structure may be ascertained by comparing the images collected using the radiation coming from multiple directions. Accordingly, successive scanning with the off-center optics 120 and 160 may also reveal the depth and extent of shadowing from a single opaque structure in the biological sample, Accordingly, this technique can be used to ascertain what features in a scan are due to shadowing effects, an what features are related to real, new or discrete structures within the sample.

Figure 3:
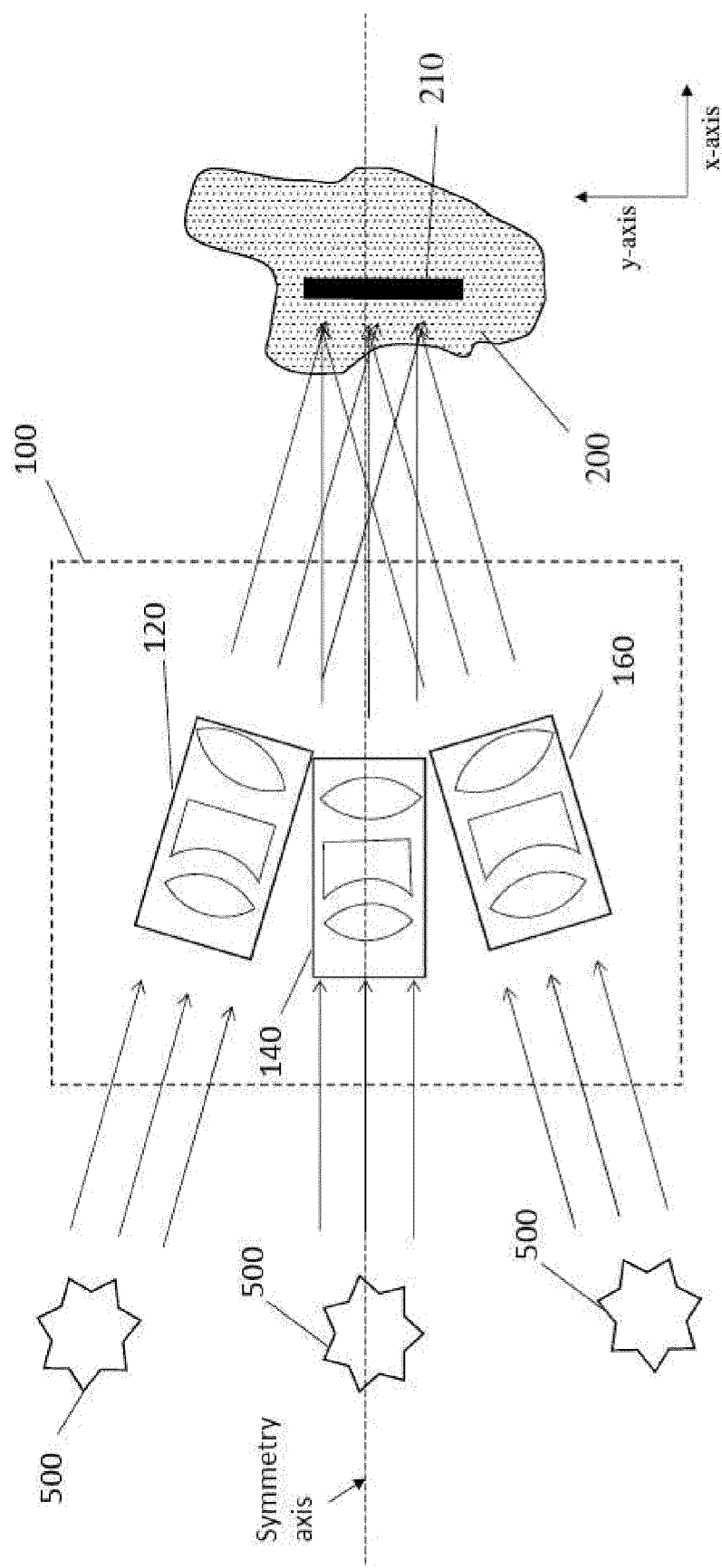
FIG. 3 is an illustration of a three overlapping line foci in a biological imaging device with three axes of propagation of radiation.

FIG. 3 is an illustration of a three overlapping line foci in a biological imaging device with three axes of propagation of radiation. FIG. 3 shows three optical subassemblies, 120, 140 and 160. The components of the three optical subassemblies 120, 140 and 160 may be similar or identical, each containing for example, two confocal lenses and a cylindrical lens. The arrangement of these components may be the same as illustrated in the embodiment shown in FIG. 1. However this is exemplary only and each optical subassembly may have different components or may they may be in a different arrangement or order.

Once again, the second optical subassembly 140 may create a line focus, however this optical assembly may not have a tilted element. Accordingly, the line focus may not be tilted with respect to the image plane, but may instead lie nearly exactly along the orthogonal direction, that is, it may lie in the image plane.

It should be noted that third optical subassembly 160 may be tilted with respect to optical assemblies 120 and 140. In other words, the optical axis of optical subassembly 160 may form an angle with respect to the optical axis of optical assemblies 120 and 140, and the propagation axis of the light traveling through it. Additionally, optical subassembly 160 may form a line focus at an angle with respect to its optical axis. By proper arrangement of the components of optical subassembly 160 and optical assemblies 120 and 140, the line focus caused by optical subassembly 160 may fall substantially exactly over the line foci resulting from optical assemblies 120 and 140. Accordingly, in FIG. 3, there may be three substantially overlapping line foci, all designated by reference number 210, because they are substantially overlapping.

Accordingly, the third optical subassembly 160 creates another line focus that falls exactly on the first two line foci from optical subassembly 120 and 140. This third optical subassembly 160 may be the mirror image of optical subassembly 120, with its tilted optical element tilted in the mirror image sense, as shown in FIG. 3. Accordingly, there may be a symmetry axis as depicted in FIG. 3, with the optical top half 120 mirrored by the optical bottom half 160.

The overlapping line foci may be applied to a biological sample 200 within a biological imaging device with three axes of propagation of radiation. As before, the biological sample 200 may have biological structures which are tagged with a fluorescent moiety. Accordingly, biological sample 200 may fluoresce when radiation from source 500 having the proper wavelength excites these fluorescent moieties. This fluorescence may be detected by an appropriate detector and used to gain information about the biological sample. By applying the radiation from three different directions, the shadowing effects of opaque structures can be effectively measured, such that detailed information about the morphology of the structure may be ascertained. If this line focus is then scanned laterally through the sample, detailed information about structures contained in the sample, but separated laterally, may be obtained. The means and methods for moving the line focus through the sample are described in considerable detail below.

If the light sources coming from the three directions 120, 140 and 160 are activated sequentially rather than in unison, the shadows may be unambiguously detected. This is because the shadow as cast from an opaque object illuminated by a light source impinging from one direction, will obscure a different area directly behind the opaque object than a shadow cast by a light source coning from another direction. Accordingly, in some embodiments, the light sources 500 may be energized sequentially, at least during a portion of the data collection.

Finally, by energizing the three beams sequentially, a shadow cast by a structure embedded in the sample can easily be distinguished from a shadow cast by, for example, a lens or mirror defect. Furthermore, this structure can also be measured in extent by sequential irradiation from the three beams. Because of the different trajectories of the three beams, shadows cast by a particle, by using three beams may be reduced or separated. Even further, by deconvolving a number of distinct shadows, which are switchable in this case, the effect of the shadows can be more easily calculated compared to a scanned beam, which creates one smooth shadow.

Figure 4:
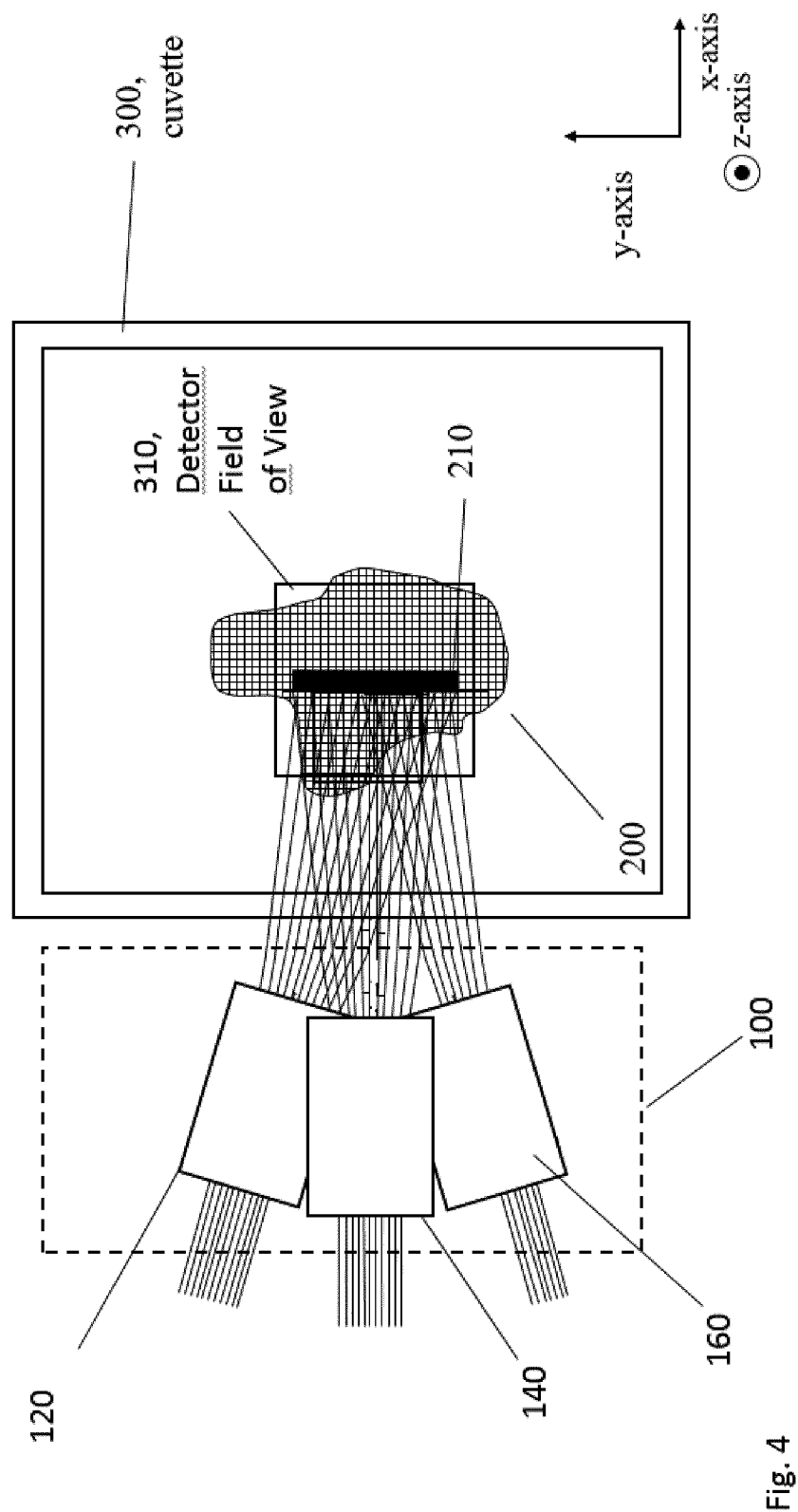
FIG. 4 is an illustration of a light sheet microscope with three axes of propagation of radiation, showing the lateral capability.

FIG. 4 is an illustration of a three overlapping line foci in a biological imaging device with three axes of propagation of radiation, wherein the biological sample is contained in a fluid vessel and imaged by a pixelated detector. The biological sample 200 may be submerged in a cuvette or other vessel 300 containing a fluid. "Cuvette" is a term used here to refer to a vessel containing sample embedded in various optical liquids. The cuvette may have at least one window which is optically transparent with low distortion to allow for diffraction limited light sheet generation. Thus the terms "cuvette", "vessel" and "container" are used interchangeably to refer to a holder or receptacle that contains a quantity of fluid. The fluid may be a clearing fluid in which a biological sample is immersed. The cuvette, vessel or container may also be open on one side for immersion of the biological sample 200 and for dipping of the objective lenses into the fluid, as will be described further below. A "clearing fluid" is a fluid that renders a biological sample relatively transparent to a probing radiation.

"Lateral" or "laterally adjacent" to a point should be understood to be defined with respect to a plane through a sample, wherein a second point laterally adjacent generally is in the same plane but offset from a first point also in the plane. An "anamorphic lens" may be a lens whose focal distance in one dimension is different that its focal distance in the other dimension. A cylindrical (line focusing) lens is one example of an anamorphic lens, having a first and a second the focal distance, wherein the first focal distance is finite, and the second focal distance is essentially infinite. Such a lens will produce a line focus at the first focal distance.

A "clearing fluid" is a biological fluid containing compounds designed to minimize non-uniform light absorption or scattering by biological structures in the sample. The use of clearing fluids is important in imaging into the depths of thicker biological sample, such that the probing radiation is able to penetrate into the depth. Hydrogen peroxide, for example, can be used as a clearing fluid to de-color hemoglobin and myoglobin, two of the primary molecules responsible for light absorption in biological tissue.

The fluid in the cuvette 300 may be a clearing fluid 1000, which may render the biological tissue transparent to radiation. The cuvette 300 may also be transparent, or may at least have at least one transparent window or opening on its side, allowing the optical radiation from the source 500 to pass into the cuvette 300, into the fluid and into the biological sample. 200. The lateral distance "A" to "B" may indicate the thickness of the transparent walls of the cuvette. Refraction effects may occur at this boundary, and the treatment of this refraction is discussed below with respect to FIG. 12.

As mentioned previously, the plurality of optical assemblies 120 and 140 (and 160 if present) may be configured such that each focuses incoming radiation into a line. The line focus due to optical subassembly 120 and 160 may substantially overlap the line focus due to optical subassembly 140. Accordingly, all optical assemblies 120, 140 and 160 may focus radiation into the same line focus 210 that falls within the biological sample 200.

Above the cuvette 300 (and not shown in FIG. 4), a detector may image the sample 200 in order to detect fluorescence emitted by the fluorescent tags, for example, when irradiated by the line focus 210. The biological sample 200 may be placed in the horizontal plane (plane of the paper) and the detector may be placed above this plane. The line focus 210 may also fall substantially in this plane. The detector may have field of view 310 that includes the line focus 210 in the sample, and may also include laterally adjacent areas. That is, the field of view of the detector may include the line 210 in its first position as well as subsequent adjacent positions, as the line focus is scanned laterally. The lateral movement of the line focus is described further below with respect to FIG. 9.

Figure 5:
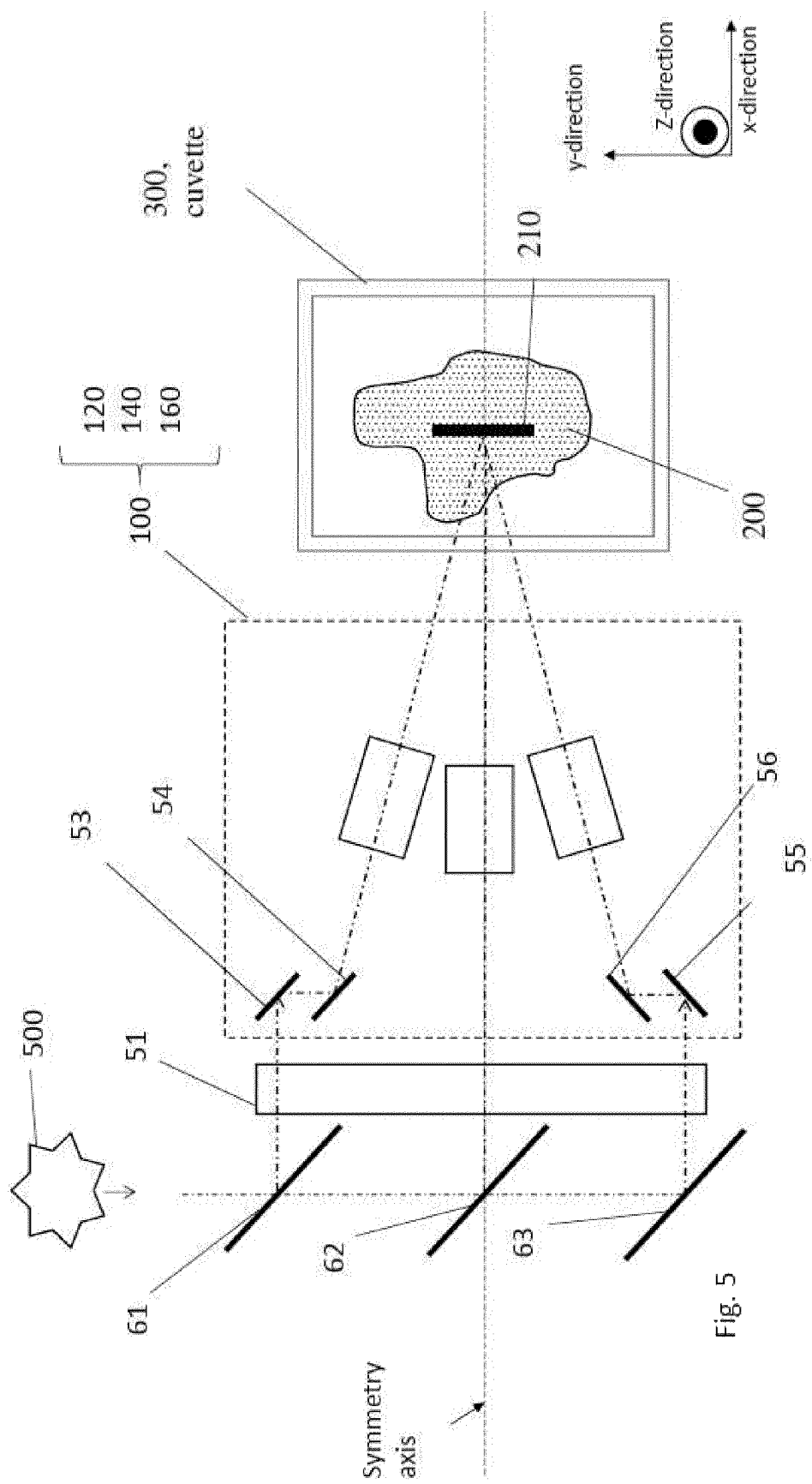
FIG. 5 is an illustration of a three overlapping line foci in a biological imaging device with three axes of propagation of radiation, having a rotatable slot structure that may define a numerical aperture of the imaging system.

FIG. 5 is an illustration of a three overlapping line foci in a biological imaging device with three axes of propagation of radiation, wherein the illustration includes additional optical elements that direct the radiation onto the sample 200. In one embodiment shown in FIG. 5, the radiation may come from a single source 500, and may be directed off three partially reflecting and partially transmitting mirrors 61, 62 and 63. Each of these mirrors may direct a portion of the radiation into parallel lines. These parallel lines may pass through an aperture 51 described further below and then proceed in a parallel fashion to a movable optical assembly 100. FIG. 5 does not show the components of subassemblies 120, 140 and 160. The important feature is that light entering movable optical assembly 100 containing subassemblies 120, 140 and 160 enters the movable assembly 100 in a parallel fashion, such that movable assembly 100 may be moved laterally without affecting the optical paths within movable assembly 100. This feature is important in moving the line focus laterally through the sample, and allows the high resolution, highly repeatable scanning capabilities of the light sheet microscope.

Accordingly, movable optical assembly 100 may contain optical subassemblies 120, 140 and 160 as was shown in FIG. 3. In addition, movable optical assembly 100 may also contain two pairs of turning mirrors 53, 54, 55 and 56. The first pair of turning mirrors 53 and 54 may redirect the parallel incoming light and direct it into optical subassembly 120 along its optical axis. The second set of turning mirrors 55 and 56 may redirect the lower leg of incoming parallel light into optical subassembly 160 along its optical axis. Accordingly, once again, the lower legs are the mirror-image of the upper legs, reflected across the symmetry axis shown.

Because the light incoming to movable optical assembly 100 is parallel, the movable optical assembly 100 can be moved laterally without changing the angles of beam propagation within the movable optical assembly 100, or the focusing properties thereof. The lateral motion will, as a result, move the line focus laterally, such that the line may be scanned left and right to move the line foci laterally within the sample. Thus, the scanning direction may be lateral, in the plane of the paper. That is, movable optical assembly 100 may be scanned horizontally (in the plane of the paper) in order to shift the line focus 210 laterally through the sample. This function is described more thoroughly with respect to FIG. 9.

An optical element 51 is also shown in FIG. 5. This component may be a rotatable component 51 which may be equipped with a number of apertures having a certain shape that pass the incoming radiation and define its optical properties. The slotted aperture 51 is shown in more detail in FIG. 6. For example, the slotted aperture 51 may define the optical numerical aperture of the system, as described in detail below with respect to FIGS. 6, 7 and 8. As indicated, the slotted aperture 51 may be rotated quickly to adapt the numerical aperture to different values within the device.

The rotatable aperture 51 may be used to select the Gaussian beam properties. In particular, as the rotatable aperture is rotated to intercept a larger portion of the beam and allow a smaller portion to pass, has the effect of defining a smaller numerical aperture to the system.

The rotatable aperture 51 may also be able to block or disable one, two or all three of the beams of light being reflected from any of the turning mirrors 61, 62 or 63. This selection may be performed by rotating the rotatable member 51 to a position where one, two or three of these parallel light beams is blocked. The rotatable member 51 may generally be oriented in a direction perpendicular to optical axes of the beams reflected off turning mirrors 61, 62 and 63 and thus can be used to select (or turn off) any of 61, 62 or 63.

Also shown in FIG. 5 is a coordinate system that applies to this figure and the figures in general. The axes in the coordinate system, x, y and z, are orthogonal with respect to one another. The x-axis is generally the scanning dimension, that is, it is the axis along which the line focus will be scanned. The y-axis is generally the direction of the line focus, that is, it is the direction that the focus lies along, and along which the radiation intensity is relatively uniform. However, it should also be understood that the scanning of the line focus may also be performed in the y-direction, that is, in the same direction as the length or extent of the line, rather than perpendicular to this dimension. The z-axis is generally the viewing direction. That is, the camera and/or detector will lie above the x-y-plane, along the z-axis. It should be understood that these orientations are arbitrary, as are designations such as "left," right," "up," "down," and "top," and "bottom" and refer only to opposing or obverse sides. The device may be held in any orientation without loss of generality.

Figures 6A, 6B:
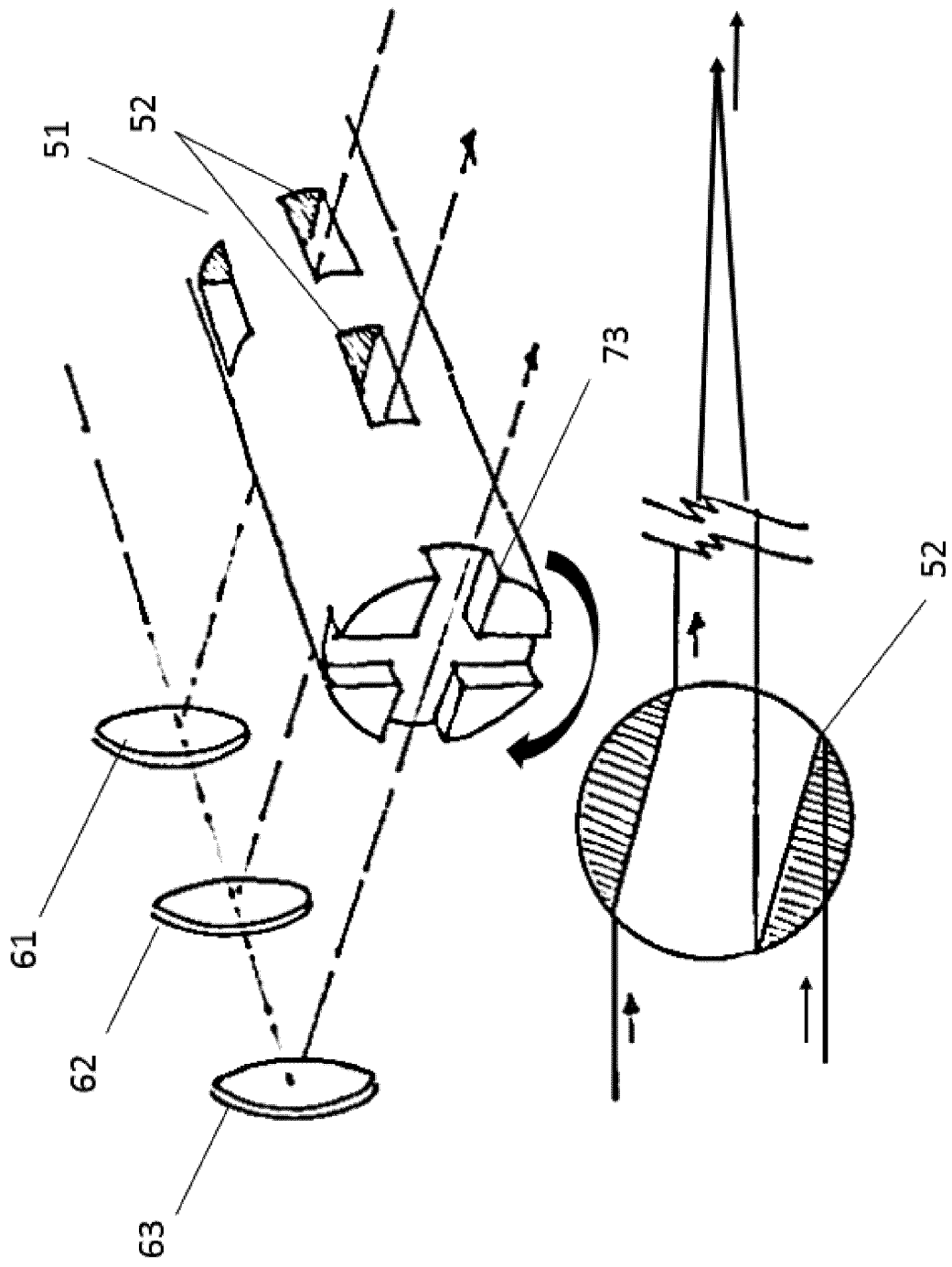
FIG. 6a is a perspective view of the rotatable slot structure that may define a numerical aperture of the imaging system.
FIG. 6b is a cross sectional view of the rotatable slot structure.

FIG. 6 shows the rotating slotted aperture 51 in greater detail. As shown in FIG. 6, the rotating member 51 may be formed with a plurality of rectangular through holes 52 formed therein. The rotating member 51 may further be equipped with a plurality of intersecting slots 73. By rotating these through holes 52 and slots 73, the clearance available to a ray of light is expanded or diminished. In other words, a shadow is effectively cast by the incoming aperture which serves to stop down the light transmitted through the structure. This effect is shown in the cross section of FIG. 6b. Because of the blocking effects of the apertures in the rotating slotted aperture 51, The radiation may be restricted in the z-direction, thus defining the numerical aperture of the system when the beam is focused into a line. These effects are described further below.

The rotating member 51 may be adjusted quickly by a single motorized axle, which may rotate the rotatable member 51. Because the plurality of apertures may be provided for each of the plurality of beams, the optical properties of the overall system may be defined quickly and inexpensively using a single actuator or a rotating stepper motor, for example. The turning mirrors 61, 62 and 63 may direct the radiation into the appropriate aperture 52 or slot 73.

The cross section shown in FIG. 6b shows the effect of rotating the rotatable component 51. As the member 51 is rotated, the leading edge of the aperture 52 obscures the beam path, blocking the upper portion of the beam from being transmitted through the aperture 52. This then truncates the downstream portion of the beam to a narrower portion than was incident on the rotatable member 51. The effect may be to decrease the numerical aperture of the optical system.

As illustrated in FIG. 6, the rotating member 51 may be a cylinder with cutouts for slots, and the cylinder may be rotated to define numerical aperture of the beam. By rotating the slotted post 51 as a unitary body, the beams sizes for all the three of the laser beams coming off turning mirror 61, 62 and 63 may be defined with one action. In other words, a single motorized stage or stepper motor (not shown) may be required to define the numerical aperture for all three beams. Because of its cylindrical geometry, the rotating member 51 may have little rotational inertia so beam switching can be very rapid. The slots that obscure parts of beam may also eliminate non-uniform fringes. A telescoping cylindrical lens 70 may determine the image size and illumination area, as will be described below with respect to FIG. 9. As with many of the optical holders and stages, the rotating member may be formed of anodized aluminum, by machining for example.

It should be noted that the beam path lengths from turning mirrors 61, 62 and 63 are all different, as shown in FIG. 5. Accordingly, the light source 500 may need a limited coherence length to avoid interferometric effects such as constructive or destructive interference. Within the rotatable aperture 51, wedged plates (not shown) may be moved to reduce coherence time below camera exposure.

In another embodiments, a set of simple adjustable slits may be used which may be independently adjustable. Use of the slits or some other selectable aperture may also reduce the amount of radiation applied to the sample so reduces heating and bleaching but primarily determines the numerical aperture and thus the quality of the imaging (resolution, step size, etc.). However, by putting the features all on a single post makes the performance and optical attributes selectable by a single actuator or motor.

Figure 7:
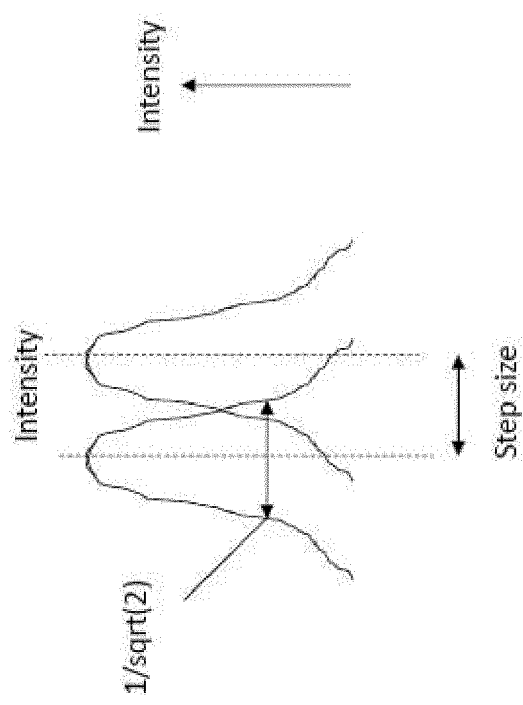
FIG. 7 is an illustration of the intensity of the line focus as a function of the lateral distance showing two successive scans, and demonstrating Gaussian propagation of the beam.

Many beams such as laser beams emitting in the TEM 00 mode have beam profiles that have a Gaussian intensity distribution. This may be the case with the optical system described here. FIG. 7 illustrates the beam intensity versus lateral position within the beam. The shape of the intensity curve shown in FIG. 7 is intended to show a generally Gaussian curve, wherein the width of the profile is characterized by the parameter b. The parameter b on the curve indicates the point at which the intensity drops to 1/sqrt(2) of the peak intensity. As is usual, the beam reaches peak intensity near the center of the distribution, and drops off with some characteristic shape to a value 1/sqrt(2) at a distance b from the center. b is referred to as the confocal parameter.

The geometric dependence of the fields of a Gaussian beam are governed by the wavelength $\lambda$ of the radiation (in the dielectric medium, not free space) and the following beam parameters, all of which are connected as detailed in the following sections. The Gaussian beam width w(x) is a function of the distance along the x-direction in which the beam propagates. $W_0$ is the beam waist and b is the depth of focus. The properties of Gaussian beams are well known, and these properties are summarized here in order to introduce parameters that will be referred to in the discussion of the design and operation of the system, which follows.

The shape of a Gaussian beam of a given wavelength $\lambda$ is governed solely by one parameter, the beam waist $w_0$. This is a measure of the beam size at the point of its focus (x=0 in the above equations) where the beam width w(x) (as defined above) is the smallest (and likewise where the intensity on-axis (r=0) is the largest). From this parameter the other parameters describing the beam geometry are determined. This includes the Rayleigh range $x_R$ and asymptotic beam divergence $\theta$. These quantities are illustrated in FIGS. 8a and 8b.

The Rayleigh distance or Rayleigh range $x_R$ is determined given a Gaussian beam's waist size. Here $\lambda$ is the wavelength of the light in the medium of propagation. At a distance from the waist equal to the Rayleigh range $x_R$, the width w of the beam is larger than it is at the focus where $w=w_0$, the beam waist. That also implies that the on-axis (r=0) intensity there is one half of the peak intensity (at x=0). This point along the beam also happens to be where the wavefront curvature (1/R) is greatest. The numerical aperture of a Gaussian beam is defined to be NA=n·sin $\theta$, where n is the index of refraction of the medium through which the beam propagates and $\theta$ is the divergence angle. This means that the Rayleigh range is related to the numerical aperture by $x_R = w_0/NA$. The distance between the two points $x=\pm x_R$ is called the confocal parameter b, or depth of focus of the beam. Gaussian beams are described in, for example, https://en.wikipedia.org/wiki/Gaussian_beam.

Accordingly, the numerical aperture $NA \sim 2w_0/b$. The smaller the NA, the larger the confocal parameter for a given beam waist. If more resolution is needed, the confocal parameter b must be smaller so the NA must be larger and the depth of field shorter. These properties may be defined by the position of the rotatable member 51 in selecting a numerical aperture. If instead, better contrast is needed and extended focal length, to get better contrast over field of view, a lower magnification and larger confocal parameter b may be selected (smaller NA). The NA aperture may also be tailored to increase the useful area of the detector. Accordingly, the rotatable member 51 may be used to extend focal length, to get better contrast over field of view by lower magnification (lower NA), and to increase the useful area of the detector. The rotatable member 51 may be used to rapidly adjust the width and numerical aperture of the system.

Accordingly, the effect of a tighter focus is a shorter beam waist and larger divergence angle $\theta$, in other words, a shorter depth of focus and higher resolution. Tighter focusing is associated with a larger numerical aperture NA. Accordingly, a larger numerical aperture NA implies a smaller confocal parameter b. Thus a more tightly focused beam can give better resolution but over a shorter distance.

FIG. 7 is an illustration of the intensity of the line focus as a function of the lateral distance from the center of the focus. A typical light intensity profile for successive scans, may generally have a Gaussian shape and follow Gaussian optics as discussed above. However, other functions may also be used, such as for example, Bessel and Lagrangian shapes.

The width of the line focus b and separation $\Delta x$ between scans may be related and chosen based on attributes of the sample (size, thickness, density, etc.), and based on performance considerations. In general, the higher the resolution, the smaller the step size and the longer the time required to complete a scan. In addition, the sample will be subjected to higher excitation intensities and thus higher temperatures, bleaching and photodamage. In other words, these variables may be related, such that design tradeoffs may need to be made. A given choice of numerical aperture may determine the step size and resolution of the scanned image. These parameters and design tradeoffs are discussed further below with respect to FIGS. 12 and 13. The choice of NA which determines the focusing attributes may also determine step size, acquisition speed, and other important system level operational attributes.

FIG. 8a is an illustration of the intensity of the line focus as a function of lateral distance, and an illustration of the beam waist and Rayleigh distance for a first numerical aperture $NA_1$. FIG. 8b is an illustration of the intensity of the line focus as a function of lateral distance, and an illustration of the beam waist and Rayleigh distance for a second numerical aperture $NA_2$, wherein $NA_2 > NA_1$. As mentioned previously, the Rayleigh length is determined by the waist radius $w_0$ and the wavelength $\lambda$.

There can thus be a trade-off between a more strongly focused beam with higher optical intensity in the focus, and a less strongly focused beam with longer Rayleigh length, i.e. larger depth of focus. The reduced NA may be perpendicular to light sheet. Choosing a wider slot increases the numerical aperture of the beam, which decreases the confocal parameter b and increases the resolution. Conversely, choosing a narrower slot may decrease the confocal parameter b, and reduce the resolution. As mentioned previously therefore, the choice of numerical aperture may drive the spacing between scans $\Delta x$ and thus the speed of image acquisition and maximum sample irradiation intensity. In view of this, the choice of numerical aperture chosen with the rotating member 51 may be a central design choice.

Figure 9:
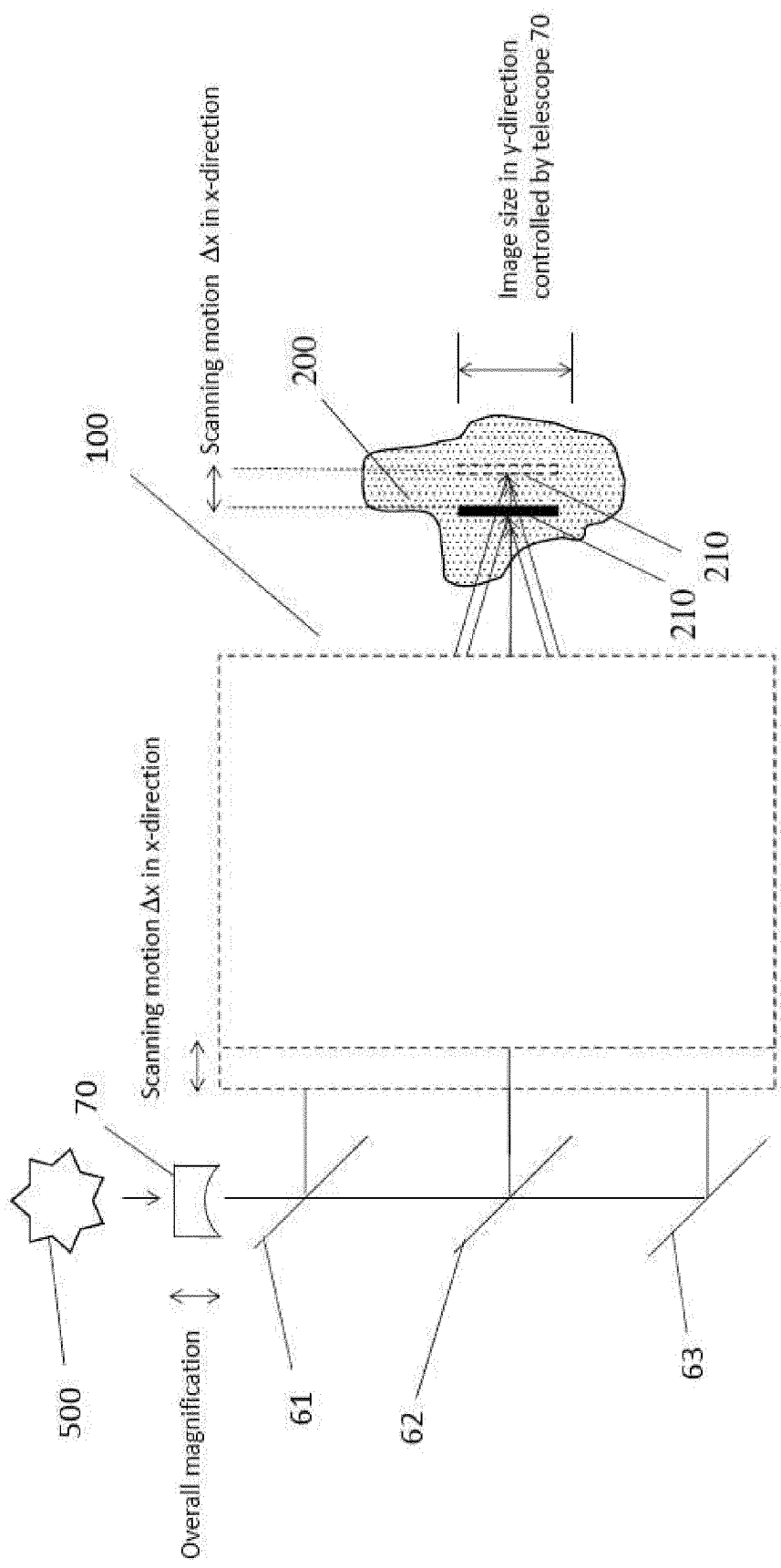
FIG. 9 is an illustration showing the lateral horizontal movement of the light sheet within the biological sample.

FIGS. 9 and 10 are embodiments exemplifying an important aspect of the light sheet microscope described here. This aspect is the ability of the movable optical assembly 100 and 101 to move laterally with respect to the sample. Because of the line focusing ability of optical assemblies 120, 140 and 160, all of which focus the radiation into substantially a single line focus, this line focus may be moved laterally back and forth by moving the movable optical assembly 100 and 101 back and forth. It should be understood that a wide variety of arrangements of optical components may exist that can render this feature, of which movable optical assemblies 100 and 101 are but two examples. These embodiments and many others are contemplated, which have this capability and a plurality of optical arrangements that accomplish this purpose are encompassed by the appended claims.

FIG. 9 is an illustration showing the lateral horizontal movement of the light sheet within the biological sample. Beam shaping may also be done by means of slits or telescopes, independent of the z-direction, to adjust the y-extent of the beam. A telescoping lens 70 shown in FIG. 9 may be used to magnify or expand the illumination area, by expanding the line focus 210 in the y-direction. In other words, magnification of the line focus, or rather expanding its lateral extent, may be adjusted by moving an upstream cylindrical telescoping lens 70 back and forth.

In other embodiments, the magnification may be determined not only by one cylindrical lens, but by a proper optical telescoping lensing system. However, the cylindrical lens 70 may have the advantage that it is simple to implement, and spherical errors in y may not impact performance substantially.

It should be understood that beams using different laser wavelengths may still be imaged using this optical system because the components are all achromatic. Accordingly, the line foci will still overlap because the focus is not a property of wavelength. The foci will all still overlap along a substantial portion of the length of the line, to approximately the diffraction limit of the focus. In optical assembly 100, the material of lenses may also be chosen (and different) to reduce chromatic aberration. Excitation using different color lasers is discussed further below with respect to FIG. 20. Detection colors may also be selected with the appropriate choice of optical filters in front of the detector, as discussed below with respect to FIG. 19.

The whole movable optical assembly 100 (or all the elements included in movable assembly 100) can be moved back and forth along the axis shown in the x-direction, to scan the light sheet through the sample. This scanning direction effectively defines the x-axis. Because of the need to move this assembly laterally without altering the focal conditions within the sample, the turning mirrors that direct the light into the movable assembly 100 may be configured so as to deliver the light in a direction parallel with the movement direction of movable assembly 100. This situation is illustrated in FIGS. 9 and 10.

It should be understood that any and all optical elements mentioned here, including the telescoping lens 70, the rotatable structure 51, turning mirrors 61, 62 and 63, and optical assemblies 120, 140 and 160 that appear in FIG. 9 on the left hand side of the biological sample 200 may also be duplicated and disposed on the right hand side of the sample 200. Accordingly, the sample may be illuminated from the left, from the right or from both sides. This system is described below with respect to FIG. 11. The components on the left hand side of light sheet system are denoted by 100. The components on the right hand side of light sheet system are denoted by 100'.

Accordingly, as shown in FIG. 9, the movable optical assembly 100 (or 100') may be moved by a distance $\Delta x$. This results in the movement of the line focus 210 by an amount similar or identical to $\Delta x$, as shown.

FIG. 10 illustrates a two embodiments 100 of a movable assembly, 100 and 101. In the first embodiment 100, similar to movable optical assembly 100 of FIG. 9, optical turning elements are included that can enable the entire optical assembly to be moved laterally toward and away from the biological sample. The effect of this movement of imaging optics is to move the line focus 210 laterally but in a plane defined by the movement of the optical assembly 100. The movable stage therefore generates the lateral horizontal movement of the light sheet within the biological sample for the imaging device.

Figure 10B:
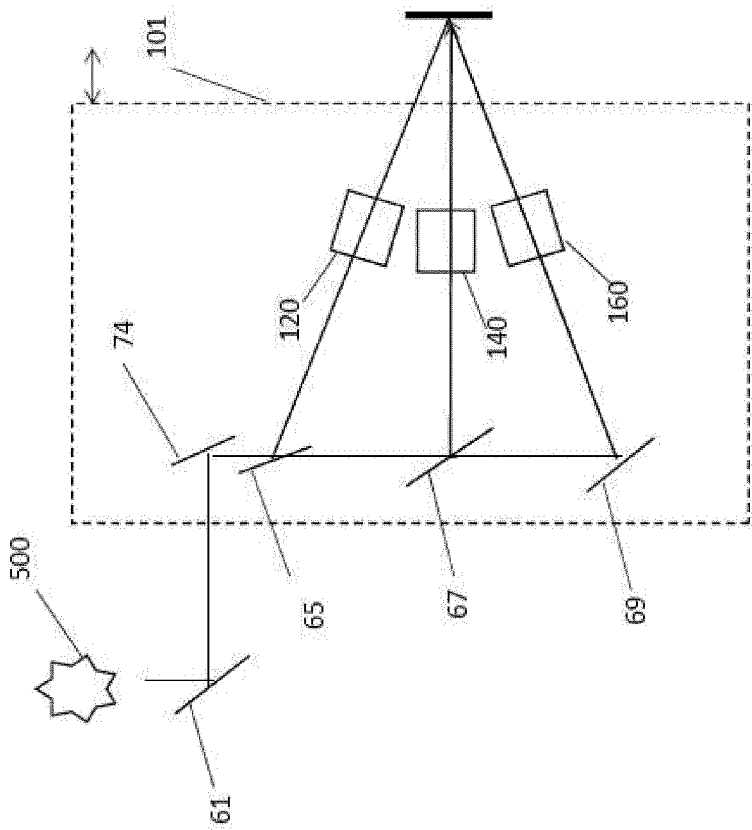
FIG. 10a, FIG. 10b are two alternative arrangements of the optical turning elements that can generate the lateral horizontal movement of the light sheet within the biological sample for the imaging device.
Figure 10A:
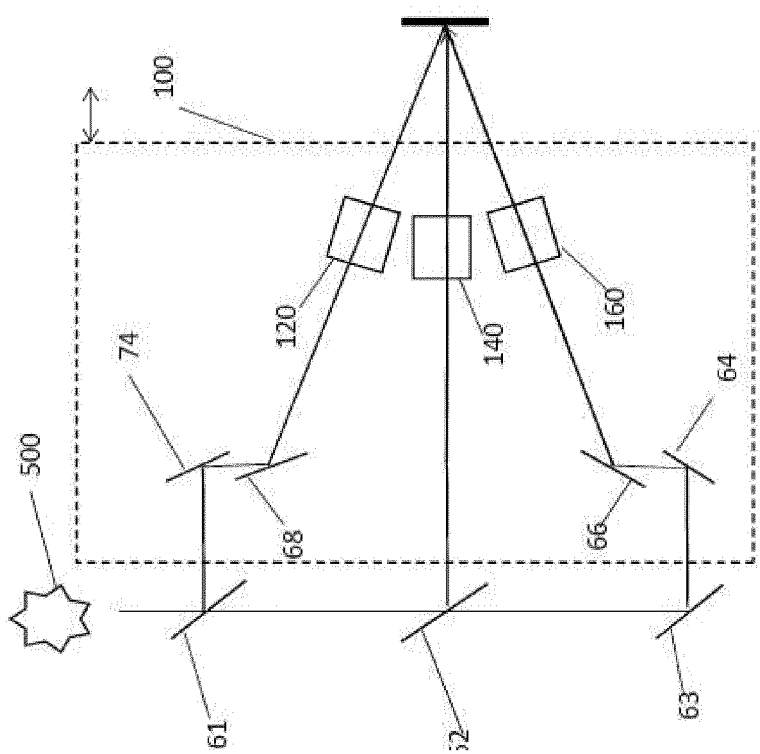

Embodiment 100 shown in FIG. 10a uses three turning mirrors 61, 62 and 63 to deliver three parallel beams into movable assembly 100. The top beam is redirected by other turning mirrors 74 and 68 and into the optical subassembly 120. Similarly, the lower beam is redirected by two other turning mirrors 64 to 66 and into the lower optical assembly 160. The third beam may enter optical subassembly 140 straight on.

In the first embodiment 100 of movable optical assembly shown in FIG. 10a, turning mirrors 61, 62 and 63, are used to direct the radiation from source 500 into the optical subassemblies 120, 140 and 160. Mirror 61 turns the radiation about 90 degrees and into the movable assembly 120. Mirror 62 turns the radiation about 90 degrees and into the movable assembly 140. Mirror 63 turns the radiation about 90 degrees and into the movable assembly 160. With the movable assembly 100, turning mirrors 74, 68, 64 and 66, direct the beams into optical subassemblies 120 and 160, respectively. For optical subassembly 140, the radiation may enter directly from turning mirror 62. Mirrors 74, 68, 64 and 66, may be analogous or identical to mirrors 53, 54, 56 and 55 in FIG. 5.

In another embodiment 101 of movable optical assembly shown in FIG. 10b, turning mirrors a single turning mirror 61 may be used to direct a single beam into the moving optical subassembly 101. Mirror 61 turns the radiation about 90 degrees and into the movable assembly 100. Within the movable optical assembly 101, partially reflective/partially transmitting mirrors 74, 65, 67 and 69 may be used to direct the radiation from source 500 into the optical subassemblies 120, 140 and 160. More specifically, movable assembly then uses turning mirror 74 inside movable optical assembly 101 to direct the beam onto the partially reflecting and partially transmitting mirrors 65, 67 and 69. Each of these partially reflecting and partially transmitting mirrors 65, 67 and 69 then direct the radiation into the optical subassemblies 120, 140 and 160. Because these subassemblies 120, 140 and 160 are disposed at angles with respect to the symmetry axis and center optical subassembly 140, the angles of the three partially reflecting and partially transmitting mirrors 64, 65 and 66 are all different, as shown in FIG. 10b.

As mentioned, the second embodiment of movable optical assembly 101 may use the single turning mirror 61 to deflect the radiation from the source 500 into the movable assembly 101. This embodiment may have fewer turning mirrors than the embodiment shown in FIG. 9, and may thus be cheaper or easier to align. However, as with embodiment 100 above, optical turning elements are included that can enable the entire optical assembly to be moved laterally toward and away from the biological sample. The effect of this movement of imaging optics is to move the line focus 210 laterally but in a plane defined by the movement of the optical assembly 101. The movable stage therefore generates the lateral horizontal movement of the light sheet within the biological sample for the imaging device.

Figure 11:
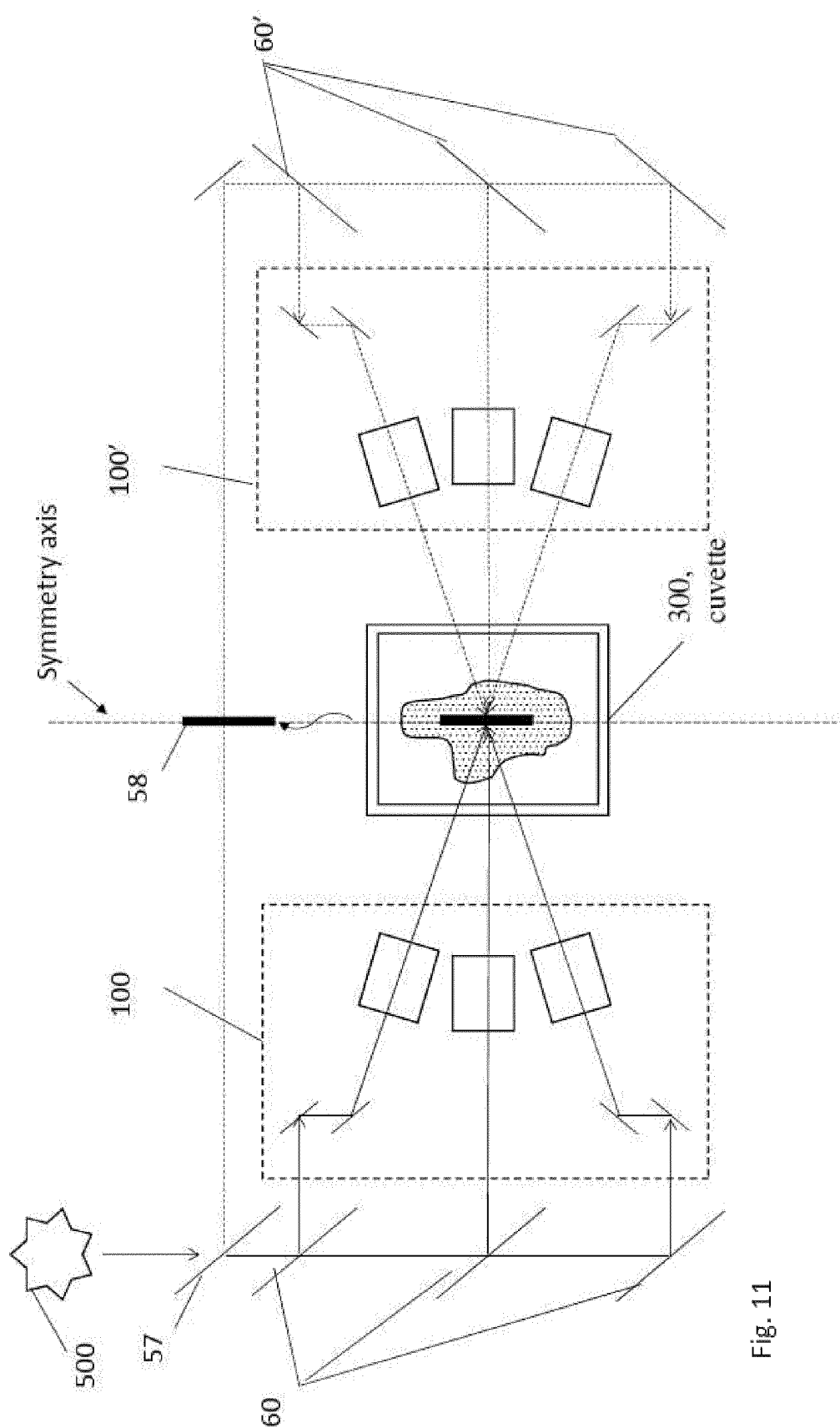
FIG. 11 is an illustration showing the left side and right side lateral horizontal movement of the light sheet within the biological sample, which may image the sample from the left and from the right, respectively.

FIG. 11 is an illustration of a larger portion of a light sheet microscope according to this invention. Illustrated in FIG. 11 is a first movable optical assembly 100 on the left hand side and a second movable optical assembly 100' on the right hand side. It should be understood that this movable optical assembly 100 may be that illustrated in FIG. 9, or it may be that illustrated in FIG. 10a or 10b, or it may be another embodiment capable of moving the substantially single line focus laterally within the biological sample. Also shown in FIG. 11 is a second movable optical assembly 100' disposed on the opposite side of the biological sample 200 and cuvette 300. Accordingly, the biological sample may be illuminated from the left by movable optical assembly 100 and from the right by movable optical assembly 100'.

As will be explained in greater detail below, an image may be created by collecting a plurality of camera images each with the line focus 210 in a different location within the sample. At the beginning of image acquisition, a partially transmitting turning mirror 57 may direct radiation from a source 500 to a mirrored shutter 58, which may redirect the source radiation 500 into the first movable optical assembly 100. Movable optical assembly 100 may focus the radiation in a substantially single line focus. Then, by moving optical assembly 100 from left to right, the far left edge of the biological sample may first be illuminated, and then the line focus moved successively rightward until the line focus reaches the middle of the sample. At this point, a shutter 58 may be moved or retracted to allow the radiation to pass over to the right hand movable optical assembly 100'. The sample may from that point onward be illuminated by the right hand movable optical assembly 100'. After collecting each of these successive images, a single image may be constructed from these individual scans.

Accordingly, illumination may come from either side to minimize the amount of sample material the light must penetrate. Which of the two sides 100 or 100' is operative may be selected by a shutter, or a flip mirror 58. Preferably, the shutter or flip mirror 58 is located on the symmetry axis, as shown, so that the path lengths on the right and left sides are similar or identical.

It should be understood that right hand movable optical assembly 100' is largely the mirror image of left hand movable optical assembly 100. That is, the angles of the turning mirrors 60' (in 100') may be the same as turning mirror 60 but reflected across the symmetry axis shown in FIG. 11. The components belonging to mirror image optical assembly 100' are designated by the prime (') to distinguish them from the left hand movable optical assembly 100. It should be understood that many other switching arrangements may be employed to send the radiation from source 500 to either the left hand side 100 or the right hand side 100'. These alternative optical arrangements are a design choice, and a plurality of optical arrangements may exist that accomplish this purpose of routing the beams in the desired directions. These alternative arrangements fall within the scope of the appended claims.

Figure 12:
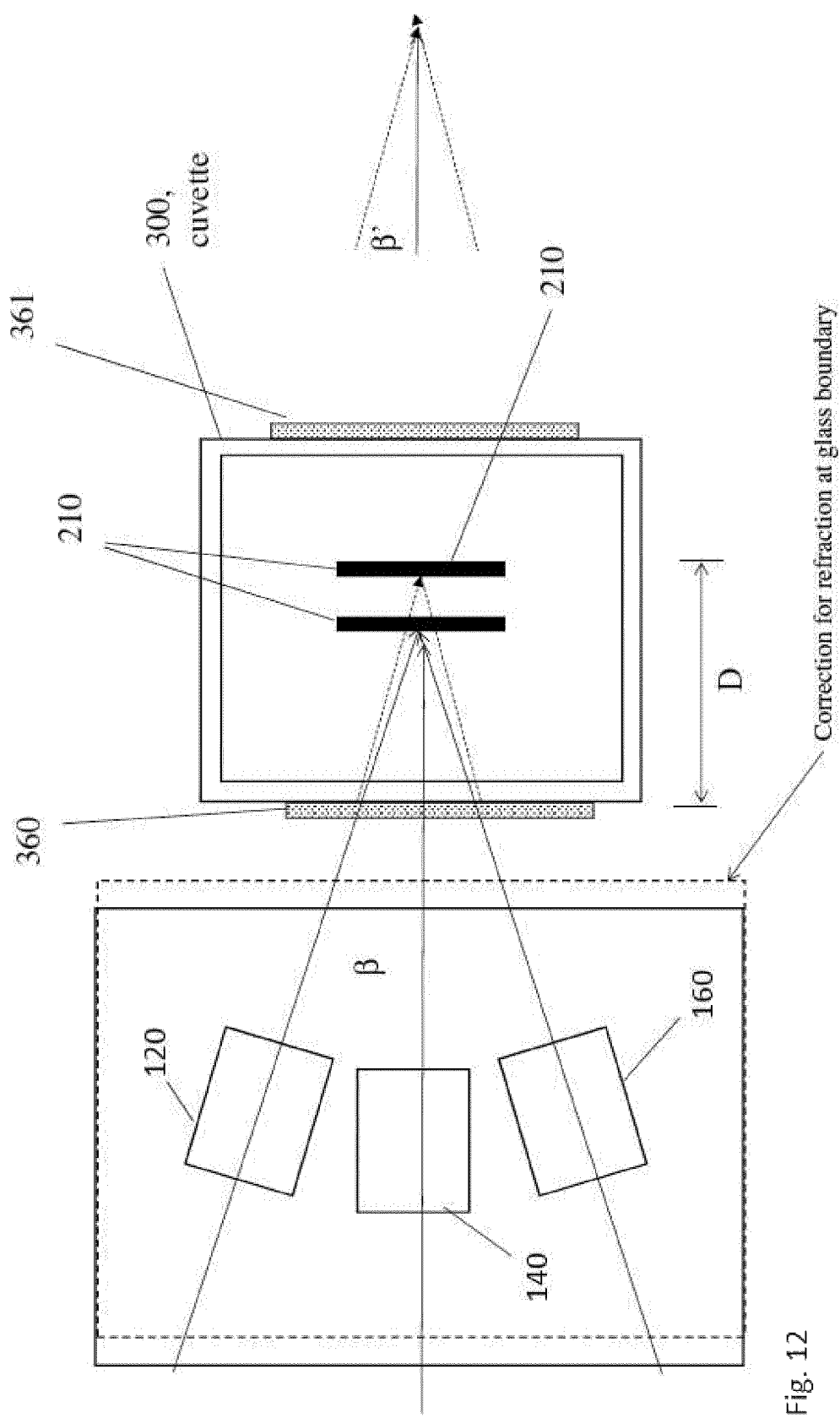
FIG. 12 is an illustration describing the correction for refraction of the light beams at the boundary of the glass liquid vessel.

FIG. 12 is an illustration describing the correction for refraction of the light beams at the boundary of the transparent liquid vessel 300. The transparent liquid vessel 300 may be glass or quartz, for example. Because of the architecture of the light sheet microscope system as described here, some of the beams of light must necessarily enter the cuvette 300 via the transparent window 360 and 361, with a somewhat oblique angle of incidence β. Accordingly, passing into the cuvette 300, the radiation must pass several boundaries, and so is refracted at a different angle than was incident. It should be understood that the largest refractive effect may occur at the outside air/glass boundary, as this boundary separates materials with the most dissimilar refractive indices.

As is well known from Snell's law, refraction of the light will then occur at the boundary between materials, such that the oblique light enters the cuvette with a somewhat shallower angle than it enters. Accordingly, because of refraction at glass and liquid boundaries, the focus of inner, central beam 140 will occur at a different spot in x-direction relative to outer beams 120 and 160. In other words, if the angle between the upper leg and the lower leg is 2β, with which the radiation enters the transparent window 360 and cuvette 300, the radiation may exit with a different angle between the upper and lower legs. In general, the exit angle is somewhat smaller than the entrance angle, 2β–. Accordingly, the overlapping line foci will take place at a slightly longer distance D from the transparent window as it would have had refraction not occurred.

For this reason, it may be advantageous to displace or shift the optical assembly 100 and 100' by an amount to accommodate this change in focal length. The amount of the shift D can readily be calculated using basic optical principles such as Snell's Law. For example, N=1 outside cuvette, n=1.5 inside. Sin a/sin b=1.5. So if the original angle $α_1$ is 16 degrees, the exit angle may be closer to 11 degrees, and focus may occurs at about n×d away from nominal focus. Accordingly, it may be important to retard the placement of the movable optical assembly 100 by this amount, to assure that the line focus falls within the biological sample 200 as intended.

Alternatively, the components 120 and 160 may be staggered with respect to component 140 in order to accommodate the change in angle of their obliquely incident light. Accordingly, it may be possible to advance middle optics 140 relative to outer optics 120 and 160 by an amount to account for refraction at the material boundaries.

These same operations may be performed on the components in the right hand side optical assembly 100'.

Alternatively, the tilt of the elements 120 and 160 may be adjusted to compensate for this offset, such that lines overlap perfectly at the line focus 210, or substantially to the diffraction limit, which is to say within about 5× of the diffraction limit.

In some embodiments, the software running the controller may be told what the index of the transparent window 360 and/or the fluid 1000 is, in order to shift image by an appropriate amount. This may be especially important in blending of the left hand side and right hand side illuminated scans.

Because the biological sample 200 may be immersed in a clearing fluid 1000, the sample 200 and clearing fluid 1000 may be contained in a cuvette 300 as mentioned previously. Since the radiation being must pass into the cuvette, at least a portion of the cuvette may be made from a transparent material such as glass or quartz. The transparent material will have a different index of refraction as compared with air. Glass for example has an index of refraction of about 1.5, as compared to the index of refraction of air, which is about 1.

Because of the difference in refractive index between the two materials, refraction of the light may occur, resulting in changes to the focal characteristics of the light beam. A correction for this effect may be made, as described above.

The discussion now turns to the computational aspects of the light sheet microscope.

Image Formation and Restoration

The discussion now turns to image processing techniques which may be used in combination with the light sheet microscope described above to obtain high resolution, three dimensional images of a biological structure.

FIG. 13 is an illustration showing the pixelated detector which captures the image produced by the light sheet microscope from the biological sample. FIG. 13 shows the relationship between the line focus 210 and the detector field of view 310. As shown, the line focus may be generated at an angle with respect to the optical axis. The detector may be a pixelated detector such as a CMOS or CCD camera. The figure also shows the relationship between the pixelated detector, the line focus and the coordinate system used in the figures to follow.

FIG. 13 shows a line focus generated at an angle with respect to the optical axis of optical assembly 120 or 160. The y-dimension is generally in the direction of the line focus, and along that line. The x-direction which is the direction of the lateral scanning, is orthogonal to the y-direction. The camera is generally positioned such that the sample image falls generally near the center of the field of view of the detector, in order to efficiently use the pixel area within the detector. The optical axis of the objective lens of the imaging microscope is aligned along the z-axis and orthogonal to both x- and y-directions.

The data acquired by pixelated detector 600 may include blur, distortion, and/or optical aberrations, and the blur, distortion, and/or optical aberrations may be a repeatable characteristic of the complete optical system. The excitation (lasers) may exhibit its own unique and characteristic distortions, such that a part of the recorded image's blur is caused by the intensity distribution of the collimated laser sheets $\Lambda_1$ which is not completely flat but a 3D-intensity distribution, see FIG. 15a. Further the x/y-plane defined by the geometry of the excitation lasers may not be exactly perpendicular to the microscope turret's z-axis and consequently does not align to the microscope's focal plane (the term focal plane means the focal plane of the microscope on the side of the sample to be magnified), see FIG. 15c for perfect alignment. Further unique and characteristic distortions of the recorded image are caused by the microscope, which exhibits in general a function $\Lambda_2$ that maps the observed 3D-fluorescence distribution traveling towards the microscope to a 2D image on the surface of the pixelated detector (see FIG. 15d: "microscope image"), whereat that mapping function $\Lambda_2$ may change its shape or orientation across the x/y-plane (as shown in FIG. 15b) which means that it is spatially varying and as such it rules out a simplistic numerical deconvolution. Finally this 2D microscope image is sampled and converted by the pixelated detector 600 which may come with its own 610 characteristic point spread function (PSF) $\Lambda_3$.

It should be understood that the term "point spread function" is used interchangeably herein with the term "intensity distribution function" and "excitation distribution function". Each of these terms should be understood to refer to a measurable and repeatable noise source within the imaging system. Furthermore, the term "imaging system" should be understood to may an optical system that can form a two dimensional image of an object. Examples of imaging systems are optical lensing system that form an image, or a microscope for example.

Figure 14:
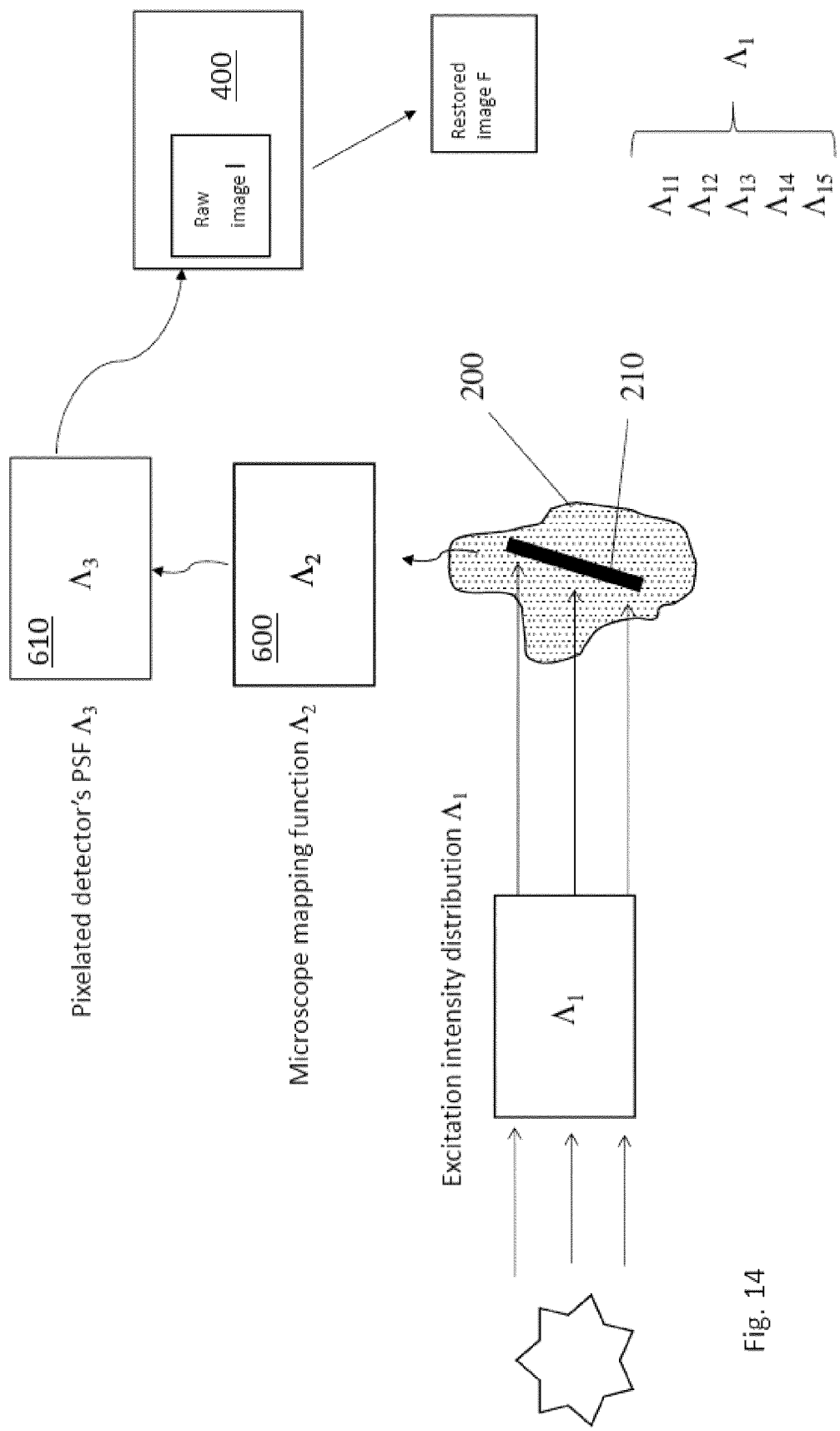
FIG. 14 is an illustration showing the point spread functions of the excitation $\Lambda_1$ and the detection $\Lambda_2$, $\Lambda_3$ produced by the light sheet microscope from the biological sample.

Knowledge of the functions $\Lambda_1$, $\Lambda_2$, $\Lambda_3$ can be very useful because these reproducible distortions may be removed from the final raw image I recorded by the pixelated detector using a numerical 3D restoration process resulting in the restored image F, see FIG. 14. This goal may be pursued by employing e.g. an iterative maximum-likelihood optimization process. Alternatively, artificial intelligence driven processes may eliminate blur, distortion, and/or optical aberrations from recorded a raw image I merely on a data driven approach that may not need specific knowledge the of the functions $\Lambda_1$, $\Lambda_2$, $\Lambda_3$. Also a mixture of both approaches may be beneficial, especially when the functions $\Lambda_1$, $\Lambda_2$, $\Lambda_3$ are known only approximately. As the functions $\Lambda_1$, $\Lambda_2$, $\Lambda_3$ constitute a part of the total system matrix $\underline{A}$ the system matrix itself may also be determined by a maximum likelihood optimization of $\underline{A}$ parallel to the restoration of the raw image I. A simplistic approach to correct the raw image I is a deconvolution process, which may be carried out in the frequency domain. Deconvolutions and the more sophisticated methods from above are well known, and the specific details will not be set forth here. The discussion to follow is directed primarily to the acquisition of the functions $\Lambda_1$, $\Lambda_2$, $\Lambda_3$.

FIG. 14 shows a schematic illustration of the excitation intensity distribution $\Lambda_1$, the microscope mapping function $\Lambda_2$ and the pixelated detector's PSF $\Lambda_3$. The blur, distortion, and/or optical aberrations are shown schematically simply as boxes, to indicate that an incoming signal is altered or transformed in a predictable and reproducible way as effect of the functions $\Lambda_1$, $\Lambda_2$, $\Lambda_3$. To the extent that $\Lambda_1$, $\Lambda_2$, $\Lambda_3$ can be ascertained or measured, as described next, these predictable alterations can be removed from the raw image I by the controller 400 by one of the aforementioned processes. The functions $\Lambda_1$, $\Lambda_2$, $\Lambda_3$ may be calculated numerically by controller 400 based on the data acquired through the lenses and detector. Controller 400 may also perform the restoration process employing these functions $\Lambda_1$, $\Lambda_2$, $\Lambda_3$. The result will yield the corrected image F, as shown in FIG. 14. Because $\Lambda_3$ generally occurs in combination with $\Lambda_2$, in some instances only $\Lambda_2$, will be mentioned. However, depending on the context, $\Lambda_2$, may be understood to also include $\Lambda_3$.

As shown in FIG. 14, the functions $\Lambda_1$, $\Lambda_2$, $\Lambda_3$ are produced by the light sheet microscope (laser optics, microscope optics, pixelated detector) and contribute to the data collected and displayed as the raw image I from the biological sample. FIG. 14 illustrates the controller 400 which may control image acquisition, image processing, and movement of the movable optical assemblies 100 and 100'.

FIG. 15 portrays the different steps of image formation. FIG. 15a shows a cross section in the x/z plane that shows two iso-intensity lines of a laser sheet. This laser sheet will give rise for fluorescence when hitting an appropriate sample. The movable optical assemblies 100 and 100' however will produce several light sheets and each of them may initially not be oriented perfectly horizontally, but may be tilted along the x-axis or y-axis or both. Further, the initial alignment of the individual light sheets may be suboptimal. FIG. 15b shows an example of the microscope's mapping function $\Lambda_2$, here depicted as a series of double-cones whose tails, depicted as the points where the double-cones are joined together, in general define the microscope's focal plane. In FIG. 15b the focal plane really is depicted flat, generally it may however deviate from a plane and exhibit some curvature. The focal plane defines the working distance for sample structures to be imaged with the microscope's highest resolution. FIG. 15b also shows an example for the spatial variation of the mapping function by different orientations of the double-cones. In general, also variations of the cone-shape may occur. FIG. 15c shows how the microscope's focal plane and the mean layer of the light sheet are aligned in order to match the plane of highest microscopic resolution with the plane of highest irradiation intensity.

FIG. 15d sketches the image formation employing some pointlike particles 750 at different positions that are irradiated by the laser and that consequently emit fluorescence light. It is useful to understand the microscope's imaging process as if it maps the fluorescence light originating from a specific point-like particle 750 in the 3D-sample space to a blob or to a ring-like area in its 2D-image plane (the term image plane means the focal plane of the microscope on the side of the image generated by the microscope). If the particle lies in the focal plane, the sharpest part of the mapping function $\Lambda_2$ will give rise to a mapped blob, whereas a point-like structure away from the focal plane of the microscope will be sampled by the cone-wall-like part of the mapping function resulting in a mapped ring in the microscope's image plane. For point-like structures at the side of the optical axis of the microscope the mapping function may be tilted and consequently a particle outside the microscope's focal plane will be mapped to an ellipse. In order to generate digital images a pixelated detector may be used to detect the image formed by the microscope on the surface of the pixelated detector. With some simplifications a constant PSF $\Lambda_3$ may be attributed to the pixelated detector resulting in some spatially invariant blur in the resulting recorded final raw image I.

Points are not imaged to points because of optical imperfections, scattering and finite resolution (diffraction limit). Furthermore, beyond the line focus of the laser, the laser light diverges and excites fluorescence in an increasingly broader z-range of the sample, which is imaged by the microscope and introduces additional blur due to superimposing adjacent z-layers of the sample to the microscope's image which is recognized as a loss of resolution.

Accordingly, the system may measure point spread function of excitation by moving excitation laterally and vertically. Each of these individual scans may be used to 1) contribute a subset of pixels to the composite total raw image $I_C$, and 2) be used for computation of the PSF. These two techniques may be applied to each lateral scan (x-direction), and may also be applied to each scan taken stepwise through the depth (z-direction) of the sample.

Figure 16:
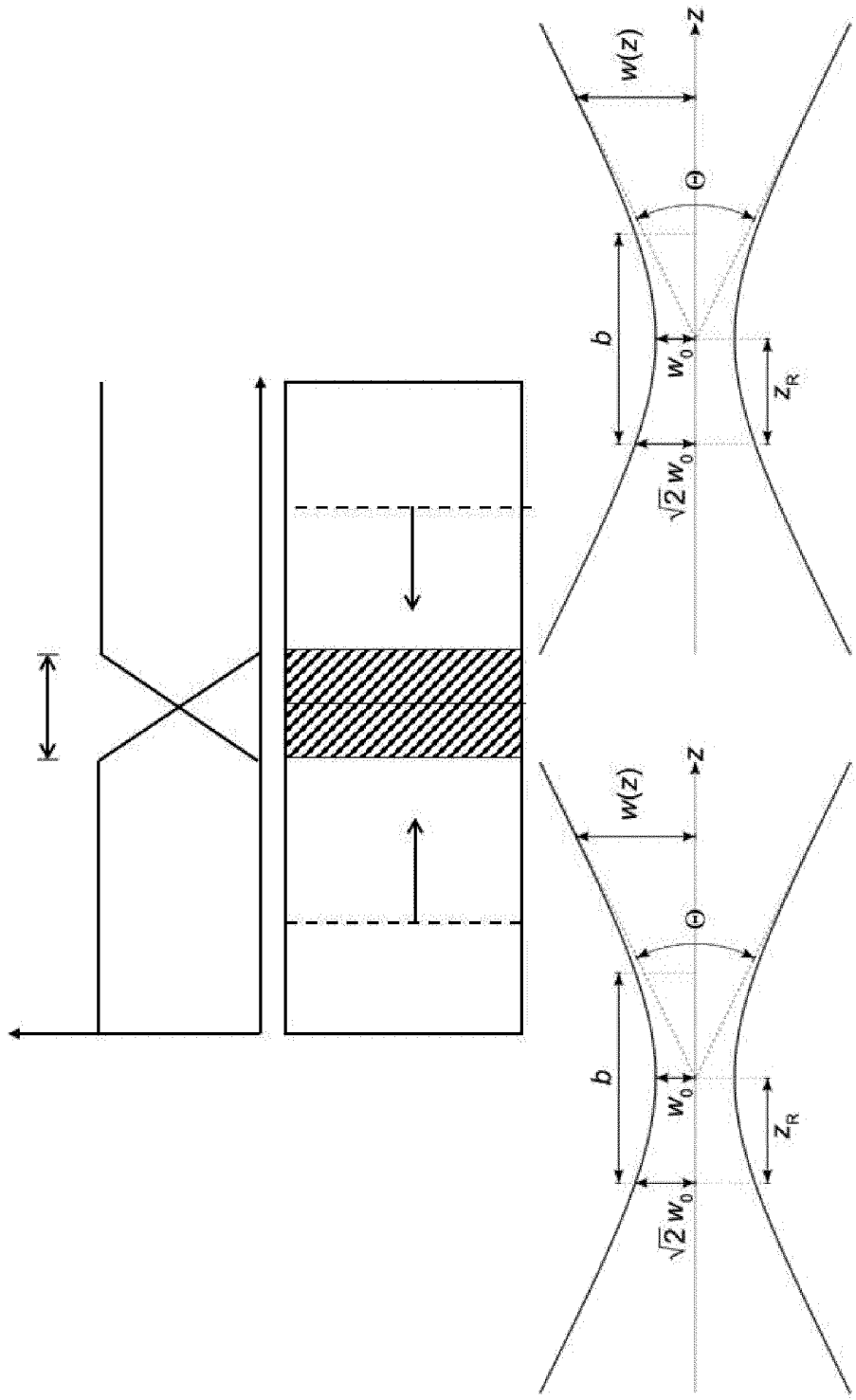
FIG. 16 is an illustration describing how the left side of the image is meshed with the right side image using the device shown in FIG. 11.

FIG. 16 is a schematic diagram illustrating how an image is assembled from a plurality of scans taken with different illumination conditions. Starting to move the movable optical assembly 100 on the left hand side, a scan is collected digitally by a pixelated camera with the line focus in a first position. The line focus is then moved laterally, and another scan is taken. The data handling of each of these lateral scans is discussed below with respect to FIG. 17. This continues until approximately the middle of the sample is reached. At this point, the right hand movable optical assembly is used to illuminate the sample from the opposite side. In the middle of the image where the illumination shifts from the left hand side movable optical assembly 100 to the right hand side movable optical assembly 100', the scans are blended electronically using a software algorithm.

This software algorithm may identify noteworthy pixels or sets of pixels that provide an identifiable feature in both the right hand scan and the left hand scan. The scans are then aligned to this point or to a set of points. The scanned images are then blended to assemble what will be referred to hereafter as the "composite raw Image $I_C$" wherein $I_C$ can be understood to be a digital file having the blended data associated with each pixel in the pixelated detector. A blending and offset function may be applied to the data to improve the smoothness and accuracy of the match. In the middle transition region from left side optical assembly 100 to right side optical assembly 100', the contribution from the side which has been active up until the transition may be given a gradually reduced weight, whereas the contribution from the side coming on line is given a gradually increasing weight. This transition and the functions used are shown in FIG. 16.

Figure 17:
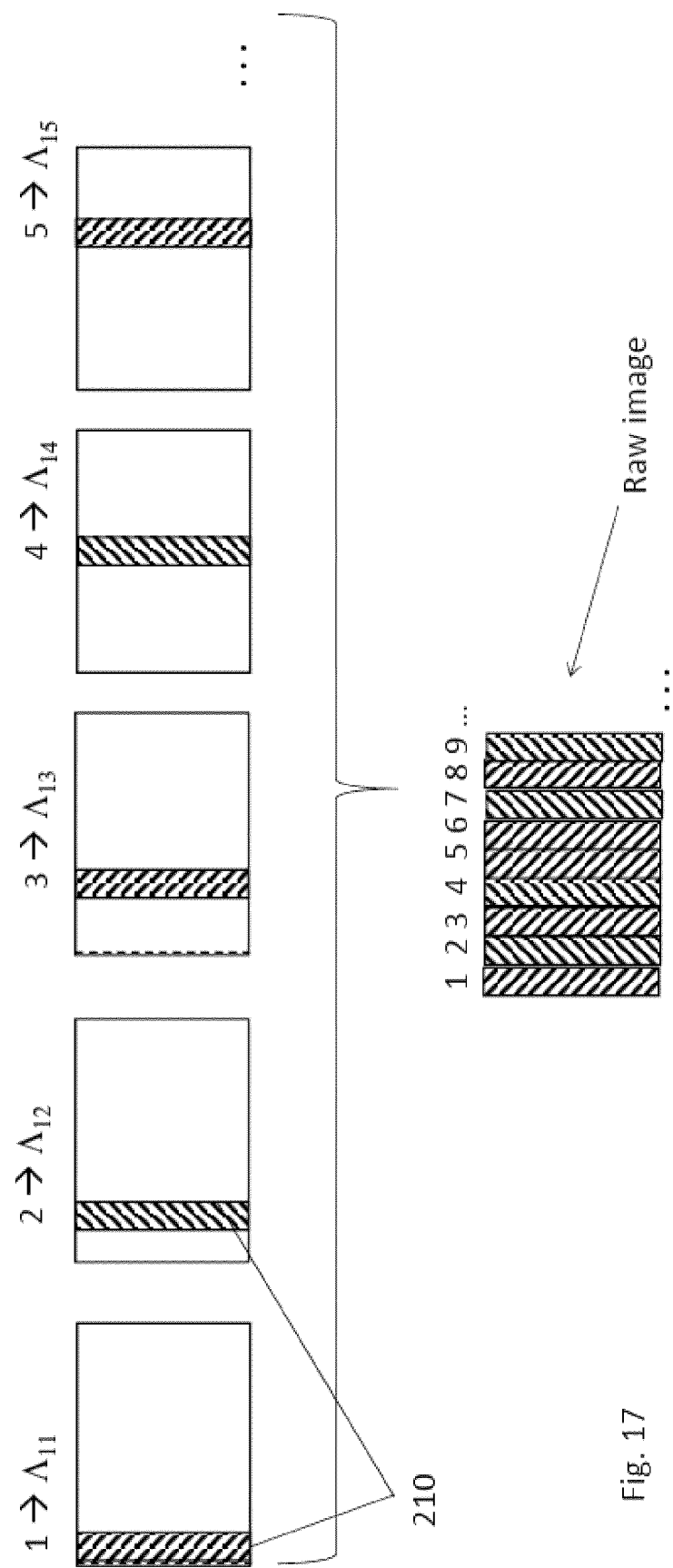
FIG. 17 is an illustration showing the lateral horizontal scanning of the light sheet through the biological sample in the x-direction.

FIG. 17 is an illustration showing the step-wise lateral horizontal scanning of the light sheet through the biological sample. For each image, 1, 2, 3, 4 and 5, the line focus 210 is shifted laterally by translating the movable optical assembly 100. An image is taken with the line focus as shown in each image. Although five line foci are shown in FIG. 17, it should be understood that there may be many more images and many more line focus positions than just five. The lateral separation (i.e. the distance between the scans) may be a performance choice that can be made, based on the numerical aperture selection made as described above with respect to FIGS. 8 and 9.

The detector and computer may capture a sequence of images 1-5 as shown in FIG. 17. These raw images I may be used as input for image restoration and may also be used to calculate the functions $\Lambda_1$ and $\Lambda_2$. On the other hand, they may be used as input for assembly of the composite raw image $I_C$ that is composed of not image-restored stripes of raw image I sequences. As the image restoration process takes into account, if available, all sequences of scanned line foci and z-positions (scanned through the depth of the sample), the assembly of composite restored images Fc may be performed by the restoration process itself. These techniques are described below.

Firstly, the portions of the image which include the line focus 210 which is depicted as the cross-hatched portions, may be assembled strip by strip into the final composite raw image $I_C$ shown at the bottom of FIG. 17. The composite raw image may therefore have subsets of each of scans 1-5 included therein. That portion of the scans 1-5 may be selected whose width is approximately within the Rayleigh length $z_R$ (see FIG. 16) of the beam waist. Data outside that range may be ignored in the formation of the composite image $I_C$, however this date may still contribute to the calculation of the functions $\Lambda_1$ and $\Lambda_2$, as described below, or for the image restoration process. Accordingly, the Rayleigh length may determine the step size of the sequential scans. The blending of the transitions may be handled as was the left/right transition shown in FIG. 16. Performing the blending algorithm over these scanned areas may result in superior homogeneity. It may be important to avoid adjusting any parameters during any scan, such that pixels can be compared and areas matched.

The width of strip along x (i.e. the width of the illumination) may depend on the tightness of focus $w_0$ (see FIG. 16) and thus on the NA of the optical system. By increasing resolution (increasing NA and thus increasing the tightness of focus $w_0$) one narrows the strip and decreases the number of useful pixels for the composite image. Typical is 10 steps per image with about 200 pixels per step, resulting in usually 2160 useful pixels in x-direction (scanning direction). AR is 1/10 or 1/15 or so. If the aspect ratio 10, there may be only 200 useful pixels/image, for example.

In some embodiments, it is advantageous to use a relatively large numerical aperture and perform a large number of steps. In other embodiments, a larger Rayleigh length $z_R$ and fewer steps are more appropriate. Such details will depend on the application and the type and quantity of data being sought.

Accordingly, the composite raw image $I_C$ may be assembled from the individual scans 1-5. As with the center blending algorithm the composited image may be assembled by identifying noteworthy features in a scan sequence, and fitting the data based on the characteristics of the noteworthy feature. Using this method, a composite raw image $I_C$ may be reconstructed from a series of sequential, overlapping light sheet scans. However, each of scans 1-5 may also be used in the computation of the functions $\Lambda_1$ and $\Lambda_2$, as described below, or for the image restoration process.

However, in addition, the entirety of the data from each of scan 1-5 may also be fed to the computer or controller, because these multiple images of the same field of view contain information on the functions $\Lambda_1$ and $\Lambda_2$, namely the intensity distribution of the laser and the mapping function of the microscope. In other words, as the line focus 210 is swept over a field of view, different portions of the Gaussian beam illuminate different portions of the sample. Accordingly and importantly, ALL the data collected in EVERY scan may contribute to the calculation of the function $\Lambda_2$. This data may then be used for the restoration process that forms from the raw images I the restored images F.

In other words, each of the images 1-5 may contain, both within the cross hatched regions and elsewhere, information about the functions $\Lambda_1$ and $\Lambda_2$. This includes portions that are not being significantly illuminated by the line focus 210. Accordingly, the function $\Lambda_2$ may have a contributions from the entire first image $I_{11}$. It may have another contribution from the entire second image $I_{12}$. It may have yet another contribution from the entire third image $I_{13}$ and so on. The total function $\Lambda_1$ that covers the complete spatial extent of the applied laser intensity distribution from the far left part of the line focus to the far right part of the line focus, and the total function $\Lambda_2$ of the microscope mapping functions over the complete spatial extent of the microscope's FOV may be derived from all the individual scans. This technique is then also applied to scans done through the depth of the sample, as described next.

FIG. 18 is an illustration showing scanning in the lateral dimension (x-dimension, FIG. 18*a*) and scanning in depth (z-dimension, FIG. 18*b*) to produce a three dimensional image by the light sheet microscope from the biological sample. The x-dimension scanning may be produced by moving the movable optical assembly 100 and 100' laterally in the x-dimension, which has the effect of moving the line focus 210 laterally across the biological sample 200. The separation between successive scans may be $d_1$. Furthermore, $d_1$ may be related to the beam waist and thus to numerical aperture and Rayleigh length $z_R$ of the light sheet. Similarly, the width of the line focus $d_2$ may also be related to the beam waist and thus to numerical aperture and Rayleigh length $z_R$ of the light sheet.

The sample may then be scanned through its depth in the z-direction, orthogonal to the focal plane of the microscope. The depth scanning shown in FIG. 18*b* may be accomplished by moving the biological sample up and down in the z-dimension, and then repeating the lateral scanning just described.

As was done with the lateral (x-direction) scans, the composite raw three dimensional image $I_C$ may have subsets of each of the depth scans included therein. That portion of the scans may be selected whose width is approximately within the Rayleigh length of the beam waist. The blending of the transitions may be handled as was done with the left/right transition shown in FIG. 16. Performing the blending algorithm over these scanned areas may result in superior homogeneity. Accordingly, all the data from all the scans is used either in the generation of the composite image $I_C$. Alternatively all the data from all the scans, specifically of the depth-scans could be used for the calculation of the z-variation of the functions $\Lambda_1$ and $\Lambda_2$, namely the z-variation of the intensity distribution of the laser and the mapping function of the microscope; having accomplished the measurement the functions $\Lambda_1$, $\Lambda_2$ altogether with $\Lambda_3$, all the data from all the scans may be used as input for the restoration process.

To give an example, an acceptable acquisition speed and resolution may require on the order of 20 individual scans. If B is the total width of the image plane, as shown in FIG. 18, then $d_1$=B/N, n=1 to N, typically less than 20 individual scans n. N can be as much as 100 but typically less than 20, sheets should ideally overlap. $d_1$ should be chosen keeping in mind the size of the structures being imaged.

In some embodiments, the same plane may be addressed several times. The rest of the sample does not experience sharp focused light. If one uses a sampling which is too high, photo bleaching may get relevant because the energy transfer of excitation lasers light to the sample grows with smaller sampling steps and tighter laser focus. If one uses a very low number of samples, it becomes tantamount to using a confocal microscope.

If a standard confocal microscope is used to address all layers, the whole sample is illuminated during image acquisition. As a result, the whole sample is bleached repeatedly during scanning, generating destructive heat as well. Using the scanning method of the presented invention however, the sample is illuminated by the laser specifically only in the plane of interest which may be moved vertically to the next plane of interest.

When an image is collected using several scans with the line focus moving between successive scans, the line foci may be overlapping. This may give improved performance and accuracy, because identifiable features within the image can be used to align the scans accurately before merging them into the final image.

Finally, one can combine all the data to obtain an overall description of the optical degradation processes by the functions $\Lambda_1$ and $\Lambda_2$, namely the z-variation of the intensity distribution of the laser and the mapping function of the microscope. It should be noted that each of the three beams in the movable optical assemblies 120, 140 and 160 exhibits a similar function $\Lambda_1$ because they have similar optical properties, but it may be noteworthy to point out the benefit when the geometric orientation of the three movable optical assemblies 120, 140 and 160 is meticulously aligned.

The restoration process may yield better a signal-to-noise ratio (SNR) and fewer blurring and deformation artifacts because the measured input to the restoration addresses each point in the sample volume with different excitations in x and z. Accordingly, the plurality of scans can be seen as a system of coupled linear transformations of the true unblurred and undeformed 3D-representation of the sample that can be used to set up an objective function that reaches its minimum for this true 3D-representation of the sample—which describes the usual approach of minimizing an objective function for getting a restorated image of a sample.

For a measurement with a specific sample one may separate the effect on the optical degradation imposed by the functions $\Lambda_1$ and $\Lambda_2$, namely the intensity distribution of the lasers and the mapping function of the microscope, between the part that originates from the optical system only and the part that originates due to the influence of the current sample. In order to do so, it is beneficial to perform measurements with ideal sample structures as for example glass beads (nano beads) that are embedded in a preferentially mechanically stable environment of similar refractive index as in the measurement of the specific sample, as for example agarose. As these measurements are performed on point-like objects in a surrounding environment of constant refractive index, the excitation light may be regarded as traveling through the probe without being deformed. As such the functions $\Lambda_1$ and $\Lambda_2$ resulting out of these measurements plus the function $\Lambda_3$ (describing the PSF of the pixelated detector) represent altogether the characteristics of the image forming process of the laser microscope, however without additional degradations induced by the biological sample.

The influence of the sample itself may deviate the exciting lasers from their primary paths whilst traveling deeper and deeper into the sample. Consequently portions of the sample may get illuminated that would stay unexposed if the lasers have traveled without being interacting with the sample. This deviation of function $\Lambda_1$ may be disentangled for example by techniques that compare exposures coming from focal line positions of the left hand movable optical assembly 100 and the right hand movable optical assembly 100' that both should have exposed the same part of the sample, given that there is no influence and deviation by the sample itself. Concerning $\Lambda_1$, this deviation may not only be a geometric deformation of the laser intensity distribution but also an overall attenuation and also so called shadows caused by an attenuation of certain sample substructures that appear opaque to the laser light due to insufficient or impossible probe clearing.

The influence of the sample itself may change also the microscope's mapping function $\Lambda_2$ and this deviation in general will change whilst observing z-planes of the sample that lie, from the microscope's perspective, deeper and deeper inside the sample. This is a consequence of the increasing path length that the emission light has to travel through the sample towards the microscope. Consequently the mapping function $\Lambda_2$ may be distorted in several ways; firstly the geometry of the mapping, depicted for example as double-cones in FIG. 15 may be deformed in a way specific to the sample. Secondly, the microscope's focal plane may be distorted and a curvature may be introduced, which means that the positions in x/y/z where the local mapping function has its tail, depicted as the points where the double-cones in FIG. 15 are joined together, may change. This deviation of function $\Lambda_2$ may, alongside with for example artificial intelligence based approaches, be calculated during the restorations process itself.

A way to calculate the sample-induced deviation of function $\Lambda_2$, (and also the deviation of function $\Lambda_2$) may be performed by a semi-blind restoration process that starts to restore the image of the sample by initially using the undisturbed functions $\Lambda_1$ and $\Lambda_2$, (see previous paragraphs) for an explanation of how these undisturbed functions $\Lambda_1$ and $\Lambda_2$ could be measured and calculated. After some iterations, given the numerical method operates iteratively, the functions $\Lambda_1$ and $\Lambda_2$ may be themselves be optimized in a way that minimizes another objective function where the currently achieved image of the sample enters as a constant input entity. From this stage on, both the image of the sample and the sample distorted functions $\Lambda_1$ and $\Lambda_2$ may by optimized by an alternating approach. It should be noted that this description is one among others that can be used to optimize both the image of sample and the sample distorted functions $\Lambda_1$ and $\Lambda_2$. In yet another alternative, totally blind restoration may be performed without measuring any functions $\Lambda_1$, $\Lambda_2$ and $\Lambda_3$ at all. However this is very time consuming and may not deliver a meaningful result at all, as it is in general a non-convex optimization problem that may end up in a local minimum rather than the global minimum. Therefore also in blind restoration processes one usually makes some appropriate assumptions of how the functions $\Lambda_1$, $\Lambda_2$ and $\Lambda_3$ may be structured. If these assumptions are derived from measurements and calculation of undisturbed functions $\Lambda_1$ and $\Lambda_2$ according to previous paragraphs (a starting assumption for function $\Lambda_3$ of the pixelated detector may also be given), one ends up for example in the semi-blind restoration process described above.

The discussion now turns to the mechanical and optical aspects of the light sheet microscope.

Optical Sources and Alternative Optical Paths

Figure 19:
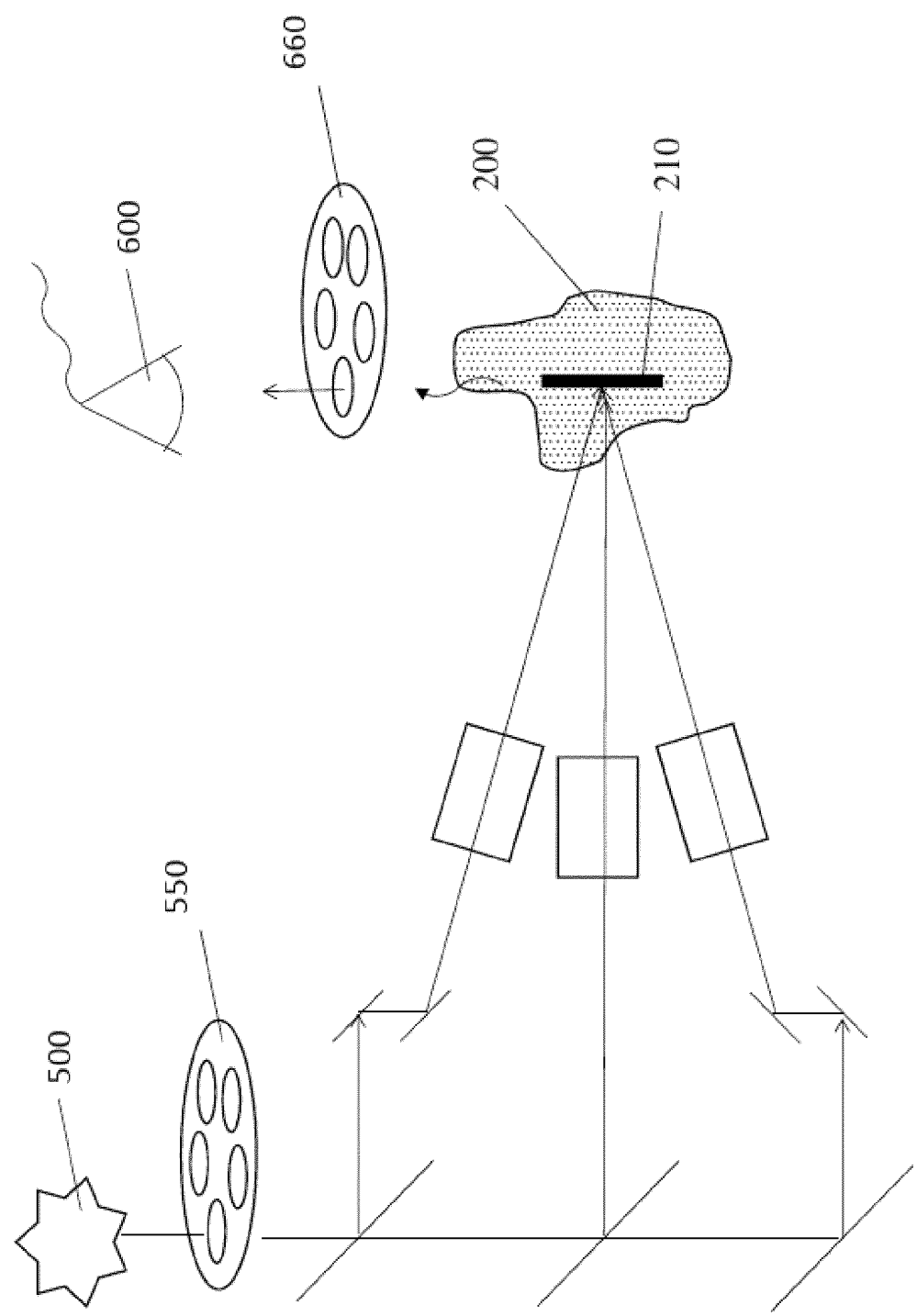
FIG. 19 is an illustration showing the filter selection to choose a working wavelength for the light sheet microscope excitation and detection.

FIG. 19 is an illustration showing additional optical components which may be advantageous for the functioning of the light sheet microscope system. The optical path may include at least two wavelength or color selectors. First wavelength selector may be a filter wheel 550 on the source of the radiation 500. The second wavelength selector may be another filter wheel 660. on the detection path. The first filter wheel 550 may select or choose the working wavelength for the light sheet microscope excitation and detection. Ordinarily detection is perpendicular (along vertical axis) to excitation but not necessarily.

A filter wheel may be an assembly of apertures arranged in a circle and covered by a material that filters some wavelengths of light while allowing other wavelengths to pass. Different apertures may be covered by different materials, and therefor transmit different wavelengths. Accordingly, the transmitted wavelength may be selected by rotating the filter wheel, to place different apertures in the beam path. One filter wheel 550 may be used after the source 500 and another filter wheel 660 may be used in front of the detector 600.

Figure 20:
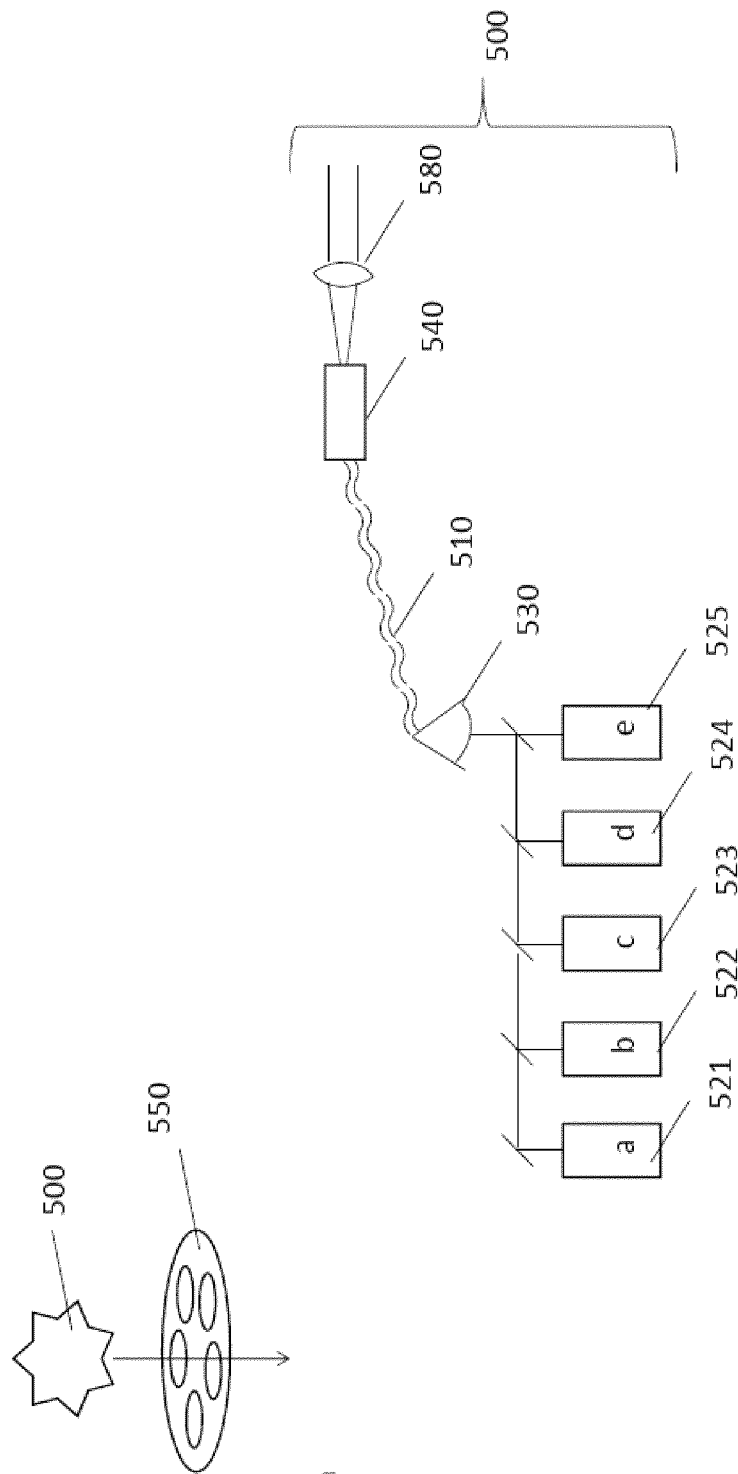
FIG. 20 is an illustration showing the plurality of optical sources (FIG. 20a and FIG. 20b) for the light sheet microscope excitation and detection.

FIG. 20 is an illustration showing some exemplary optical sources for the light sheet microscope excitation and detection. In one embodiment, a white light source 500 (FIG. 20a) can be used, and filter wheel 550 that then selects, for example, any of eight or so constituent wavelengths. Filter wheel 560 may have 8 colored filters, and may be used to serially select which wavelength to view by rotating filter wheel 550. The filter wheel 550 may have settings capable of passing important radiation lines, well known in fluorescence microscopy. These lines may include the six excitation lines at 488, 515, 553, 591, 640, 785 nm, for example.

In other embodiments (FIG. 20b), separate light sources may be used, for example laser light source 521, laser light source 522, laser light source 523, laser light source 524, and laser light source 525. Each light source may have an associated turning mirror which deflects the emitted radiation into an imaging lens 530 which may collimate or focus the radiation and input the radiation into an optical fiber 510. The optical fiber 510 may transmit the collimated radiation to another component 540 which may further modify the radiation and finally into a collimating lens 580. From collimating lens 580, the radiation may follow the path shown in FIG. 19. In other words, in the embodiment shown in FIG. 20, the single source 500 may be substituted with a plurality of discrete light sources emitting at different wavelengths 521-525. There may be 5 lasers as shown in FIG. 20. The five laser sources may be coupled by dichroic elements as shown. The laser outputs may all then be focused by a lens 530 into a fiber optic cable 510. The diverging fiber optic output may then be collimated by collimating lens 580.

Of course, there may be fewer or more discrete light sources other than those shown as 521-525.

Alternatively, the light source may use a laser combiner or a supercontinuous laser emitting in a very broad band 450-2000 nm. This range may cover four or more excitation lines. The laser combiner may be software controlled to add continuously varying quantity of any color laser.

In operation, each of the five lasers may be switched on and off. An acousto-optical modulator may be convenient for this switching. The five lasers may be high speed, femtosecond pulse emitters, so as to capture very short events.

Figure 21:
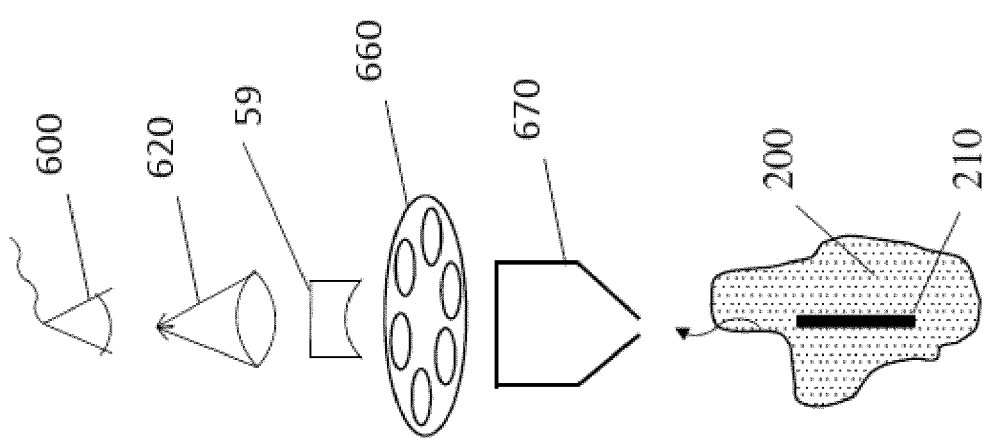
FIG. 21 is an illustration showing the components of the detector for the light sheet microscope.

FIG. 21 is an illustration showing the components of a detection path for the light sheet microscope. The detector may include an imaging objective lens 620 and another filter wheel 660. Like filter wheel 550, filter wheel 660 may only pass certain wavelengths of light. For example, it may be desirable to image all structures which are emitting at 515 nm for example. In this situation, the filter wheel 660 may be rotated until the filter element that passes 515 is placed into the path of the radiation. The selected wavelength may then be imaged onto the pixelated detector 600 by a number of other optical components including a microscope objective lens 670, depending on the application. Finally, the pixelated detector 600 may measure the light intensity at the selected wavelength and in the particular pixel element. As shown in FIG. 21, there may also be a magnifying/demagnifying element 59, which changes the magnification of the imaged sample without changing the objective lens 670. It should be understood that pixelated detector 600 depicted in FIG. 21 may be a similar or identical to pixelated detector 600 depicted in FIG. 19 and referred to in FIG. 14.

Alternatively, the detector may use two or more cameras which respond to different colors. The detector may alternatively use a color camera.

Independent Motions

One of the major advantages of the light sheet microscope described here, is that the components can be moved independently of one another. For example the line foci may always fall in a single plane defined by the motion of 100 and placement of its components 120, 140 and 160. This configuration of parts defines the image plane in which the sample is placed, and the focal plane defined by the line foci. This plane may remain fixed while many other components are moved with respect to this plane. Accordingly, once the plane is established and detection is focused or adjusted with respect to it, these adjustments may not need to be made again. This may be true even if the sample is changed, or the imaging lens is changed, or the clearing fluid is changed. The movable sample stage may be configured to always hold the sample in this plane. These advantageous features may be accomplished by using stages with independently movable stages with respect to the image plane and arranged as described next.

Figure 22B:
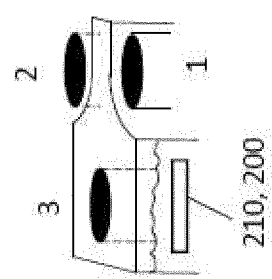
FIG. 22b is a perspective illustration of the sample stage and turreted lenses, accommodating the turreted lenses.
Figure 22C:
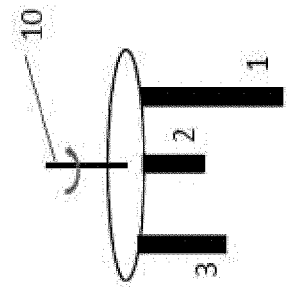
FIG. 22c is a perspective illustration of the turreted lenses.
Figure 22A:
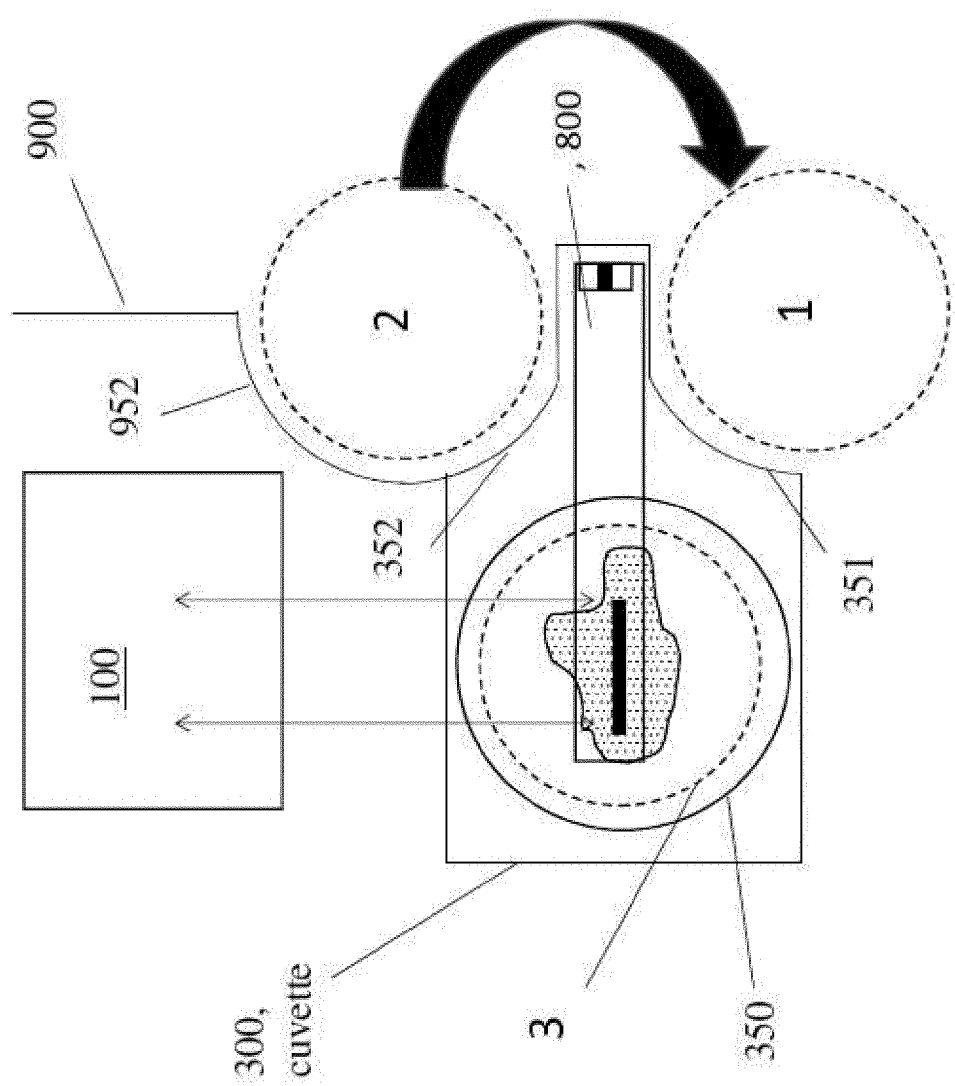
FIG. 22a is an illustration showing the ability to rotate a turret holding a plurality of objective lenses.

FIGS. 22 and 22*a*, which includes FIGS. 22*a*, 22*b*, and 22*c*, are illustrations showing a first important mechanical/optical aspect of the light sheet microscope. A turret 10 may be used which holds a plurality of objective lenses. The optical axis of each of these lenses may be parallel. Using the design shown in FIG. 22, the turret 10 may be rotated and a different objective lens may be selected, without moving the sample 200 or any of the excitation or other detection optics. The rotation may be accomplished without moving the sample or the focal plane of the line focuses. This may be important for obtaining reliable, reproducible images at a varying magnification. The movement is accommodated by having the cuvette 300 shaped with recesses that allow the objective lenses to penetrate the plane of the biological sample, even when these lenses are not in use. This allows the imaging of different areas, with different magnifications, in a manner that is exceedingly easy and fast.

For example, a microscope is described which has the three objective lenses 1, 2 and 3 mounted on a rotating turret 10. The optical axes of the lenses 1, 2 and 3 may be parallel, as mounted in the turret 10. One of the plurality of lenses, say lens number 3, may be the imaging lens which is actually in use. The others 1 and 2 of the plurality allow different magnifications and fields of view to be chosen, but are not in use at the present time. When an image is taken, the operative lens 3 is lowered into position just above the biological sample, such that the lens is submerged in the clearing fluid 1000 and contained within the perimeter of the cuvette 300. Since the non-operative lenses 1 and 2 are mounted also to the turret 10 and thus coupled to the same mechanism, these lenses 1 and 2 are lowered as well. Two cutouts or relieved areas or curved surfaces or voids 350 and 351 are designed into the cuvette to allow these lenses 1 and 2 to be lowered as well, but not to interfere with any other structures in the microscope. Accordingly, when the operative lens is submerged, the at least one inoperative lens is not submerged (i.e. is located beside the container)

The other cut outs 950 and 951 may be made in the movable stage 900 which supports the movable optical assembly 100 or 101. Theses cutouts may also be dimensioned to admit any one of the lenses 1, 2 or 3. Together, cutout 352 and 952 may admit lens 2 for example, while cutout 351 along with another cutout in stage 900 (not shown for convenience of rendering) may admit lens 1. The movable sample stage 800 may be movably placed within the cuvette 300 as shown.

When a different magnification or field of view is desired, the turret 10 may be raised until it clears the cuvette 300 and the turret 10 is then rotated to select a different operative lens. With the new lens in position, the turret is again lowered into the cuvette 300 to a position just above the sample. Because of the relieved areas 350, 351 for lenses 1 and 2, these lenses can be lowered as well without mechanical interference, because of the cutouts or relieved areas or curved surfaces or voids 350 and 351.

FIG. 22*a* is a plan view illustration showing the ability to rotate a turret holding a plurality of objective lenses. FIG. 22*b* is a perspective illustration of the sample stage 800 and cuvette 300, accommodating the turreted lenses 1, 2 and 3. FIG. 22*c* is a perspective illustration of the turreted lenses 1, 2 and 3. The turret 10 is shown schematically in FIG. 22*c*, as a rotatable mechanism to which three lenses, 1, 2 and 3 are attached. As shown in FIG. 22*c*, the different lenses may have different physical dimensions. In particular, one of the lenses 1, 2 or 3 may be substantially longer than the other two. One may also be wider in diameter than the others. The cutouts or relieved areas 350 in the cuvette 300 may be shaped so as to accommodate this dimensions. Cutout 350 may be circular and may admit the operative lens 3. Cut outs 351 and 352 may be portions of a circle, and shaped to admit the otherwise interfering portion of lenses 1, 2 or 3 as was shown in FIG. 22*a*. Accordingly, lens selection can be changed without moving anything but the lens carriage, i.e., without moving sample 200, cuvette 300 or light sheet plane or line focus plane 210. As mentioned, the other cut outs 950 and 951 may be made in the movable stage 900 which supports the movable optical assembly 100 or 101. Theses cutouts may also be dimensioned to admit any one of the lenses 1, 2 or 3. Together, cutout 352 and 952 may admit lens 2 for example, while cutout 351 along with another cutout in stage 900 (not shown for convenience of rendering) may admit lens 1. The movable sample stage 800 may be movably placed within the cuvette 300 as shown.

Figure 23:
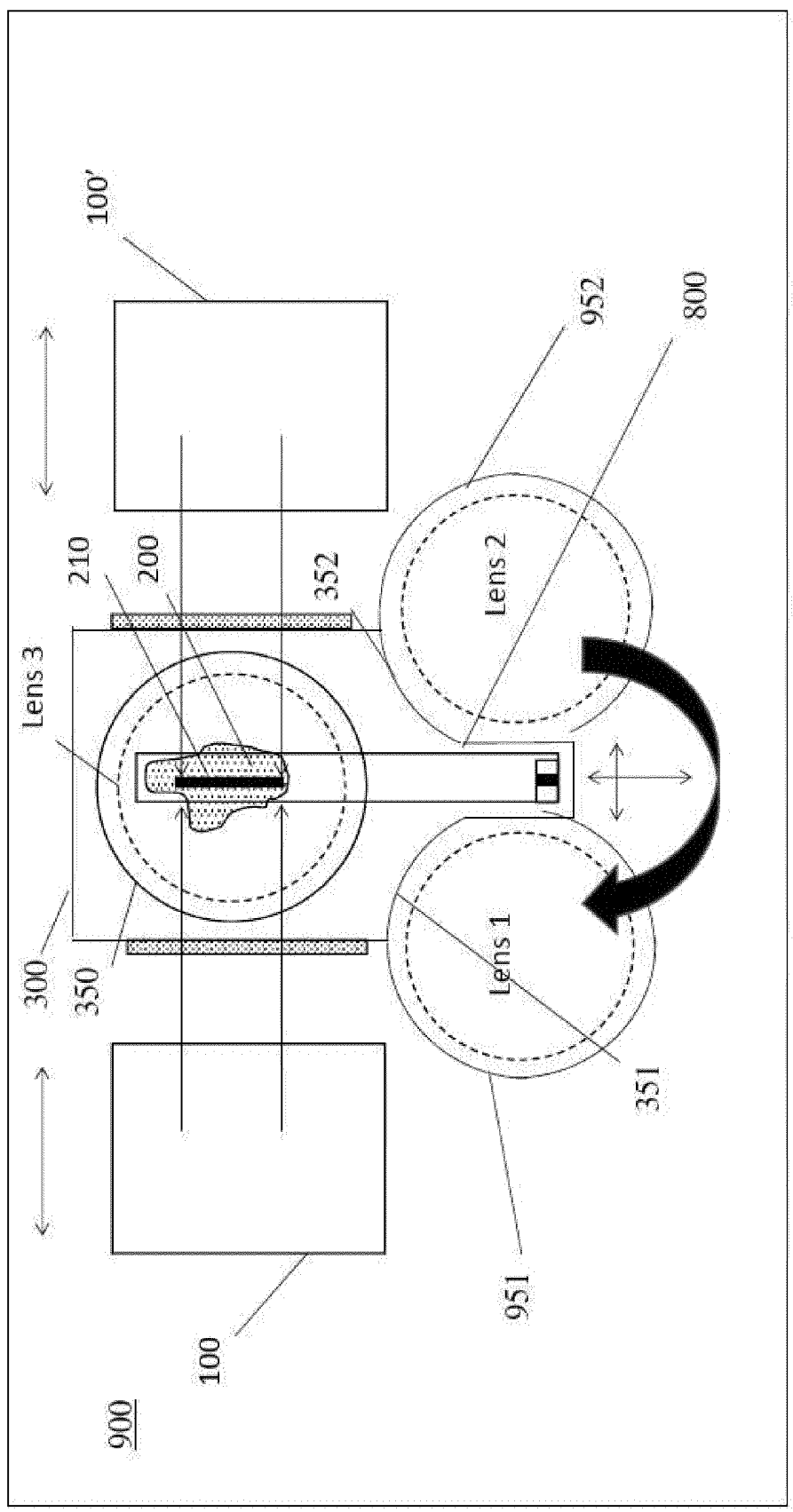
FIG. 23 is an illustration showing how the light sheet may be moved laterally independently of the turreted objective microscope.

FIG. 23 is another plan view illustration showing how the light sheet or line focal plane 210 may be moved laterally independently of the turreted objective microscope. FIG. 23 is similar to FIG. 22 except that the movable optical assemblies 100 and 100' are also shown in relation to the cuvette 300. The sample holder 800 is also shown in FIG. 23 and its motion is also shown diagrammatically. Cut outs 351, 352, 951 and 952 described above are also illustrated in FIG. 23, as are cuvette 300 and sample stage 800.

It should be understood that although the scanning direction, that is, the direction of lateral motion of the line focus, is described as being generally in the x-direction, and therefore orthogonal to the extent of the line focus, the scanning could also be performed in the y-direction (i.e. parallel to the extent of the line focus).

The software may know the focal distance of each lens so may focus automatically. The focus may be obtained simply by moving the operational objective up and down in the z-dimension. This is possible because excitation plane and the sample have not moved during this process. This capability offers substantial ease of use for changing samples and ease of use changing lens/imaging. It also lends itself to robotic, or automated functioning.

As shown in FIG. 23, the movable optical assemblies 100 and 100' may be moved laterally without moving or interfering with any other features of the light sheet microscope. The turreted lenses 1, 2 and 3 on turret 10 may also be moved without affecting or disturbing any other feature of the light sheet microscope. As described previously, cutouts 350, 351, 352, 951 and 952 may serve to admit each and any of objective lenses 1, 2 or 3. Lastly, the motion of the sample holder 800 may also be moved independently, and which movement is described further below with respect to FIG. 24.

Accordingly, for a turret with three objective lenses, the lenses are all allowed to dip into the plane of the sample. The lens may be raised by a lens raising mechanism, a new viewing lens rotated into position, and finally lowered into the fluid. Accordingly, the motion may be raise, then rotate, then lower. The system therefore fulfills the object to keep the lenses within setup while they are changed, and without moving any other components. The turret 10 holds the optical axes of the lenses in parallel and on its circular, rotating tray.

The light sheet microscope system may have yet other independently movable features. It should be understood that the openings 350, 351, 352, 951, 952, that admit the turreted objective lenses may be made in the movable optical assemblies 100, 100" or they may be made in other solid surfaces of the microscope body, such as optical platforms and stages. But in any case, theses openings 350, 950 and 951 are formed in the solid material of the light sheet microscope in order to allow the movements just described.

The light sheet microscope system may have yet other independently movable systems. The sample stage 800 and cuvette 300 may also be movable independently from the other systems. Throughout these motions, the light sheet image plane 210 may remain fixed. This configuration may be ideal for robotic handling and trays. These capabilities are illustrated in FIGS. 24, 25 and 26.

FIG. 24 illustrates another independently movable feature of the light sheet microscope. The cuvette stage 930 which supports the cuvette 300 with clearing solution 1000 may also be raised and lowered independently of the movable optical assemblies 100 and 100' the objective lenses 1, 2 and 3 on turret 10, and the sample 200 on sample holder 800. This capability is illustrated in FIG. 24a and FIG. 24b.

In FIG. 24a, the operative lens 700 is in position just above the biological sample 200. In this position, the operative lens 700 is submerged in the clearing fluid 1000. If the clearing solution of the sample 200 needs to be manipulated or changed, the stage 930 supporting the cuvette 300 may be lowered. This lowering may elevate or withdraw the biological sample 200 from the clearing fluid 1000. As shown in FIG. 24b, either the sample 200 or the clearing fluid 1000 may be changed or manipulated without changing or interfering with any other aspect of the light sheet microscope. The cuvette can be lowered without affecting the sample or sample holder. This implies that the user can take sample out without dipping into solution. Focusing, e.g., may still be adjusted even though sample has changed. The light sheet plane and detector may stay in the same relative position. No other operations are needed to move the liquid filled vessel out of the way, or to return it into position with fresh fluid, submerging the sample for imaging. As before, transparent windows 360 and 361 may admit the radiation to the sample 200.

FIGS. 25a and 25b show further details of the sample holder 800, which also has some important features. The sample holder 800 may include a sample stage arm 810 which may extend laterally from a supporting point 820. This supporting point 820 may be coupled to a movable actuator (not shown) that can raise and lower the supporting point 820. By moving the supporting point, the sample 200 may be raised or lowered into or out of the clearing solutions. The side view of FIG. 25b illustrated the relationship of the movable stage 930, sample stage 800, and cuvette 300. The sample stage 800 coupled to a sample supporting point 820. This supporting point 820 may be moved laterally or vertically by a thumbscrew or rack and pinion, for example.

It should be understood that if the sample 200 is raised, then the operative objective lens may also need to be raised to allow clearance. However, with movable supporting point 820, the sample may be removed from the clearing fluid and manipulated or exchanged without disturbing any other aspects of the light sheet microscope.

The two independent motions, of the cuvette stage 930, and the sample supporting point 820 are shown in FIG. 25b. FIG. 25a shows the components in their operative orientations in plan view. The cuvette 300 may have a large circular hole 350 in the top surface 350 that will admit the operational objective lens. This aperture 350 may allow the lens to be lowered into the clearing fluid 1000 until it is the proper distance from the biological sample such that the structures are in focus. The operational lens may then be raised until it clears the cuvette 300, and the lens assembly and turret may be rotated to place another objective lens into the operational position. The other non-operational lenses will be lowered into the cutaway surfaces 351, 352, 951 and 952.

As shown in FIG. 25, the biological sample 200 may be mounted on a movable sample stage 800. The sample stage 800 may be a motorized x, y, z stage, movable in three dimensions.

Thus, the sample stage may be movable vertically with a throw of, for example, about 30 mm. However the sample stage may also be movable laterally, with a throw of about 80 mm. Thus, the sample can be moved laterally with respect to the movable optical assemblies but importantly, it may also be movable vertically. The vertical movement may enable the three dimensional imaging capability discussed earlier. The lateral scanning, as explained before, is accomplished by moving the movable optical assemblies 100 and 100' laterally with respect to the sample, rather than by moving the sample laterally. Accordingly the plane of the line focus, that is, the plane within which the line focus moves, is established by the motion of the movable optical assemblies 100 and 100' and may not change during operation in general.

The movable sample holder 800 allows for imaging large samples e.g. up to 100×100 mm. Accordingly, the field of view/magnification may accommodate a detector with an active area on the order of 22 mm.

Accordingly, the sample holder may be manipulated independently of optics, fluidics, excitation and detection. The sample may be moved vertically in the plane for different depths and laterally for a changed imaging location. The ability to change samples without touching the excitation or detection optics offers significant benefits in terms of ease of use. The fluid receptacle or cuvette 300 can move vertically in the z-direction independently of the sample, the detector and the excitation. Accordingly, it may be possible to change samples without touching the optical system. It is also possible to change samples 200 without touching the sample holder 800.

It should also be understood that artificial intelligence techniques, such as machine learning and deep learning, using for example tensor flow records, may be used to improve the final image quality.

FIG. 26a is a side view illustration of the structures shown in plan view of FIG. 25. FIG. 26a shown the sample 200 submerged in the cuvette 300 and clearing fluid 1000. FIG. 26b shows the sample 200 retracted from the cuvette 300 and clearing fluid 1000. The light sheet plane 210 may stay in position relative to everything but the cuvette 300.

Figure 27:
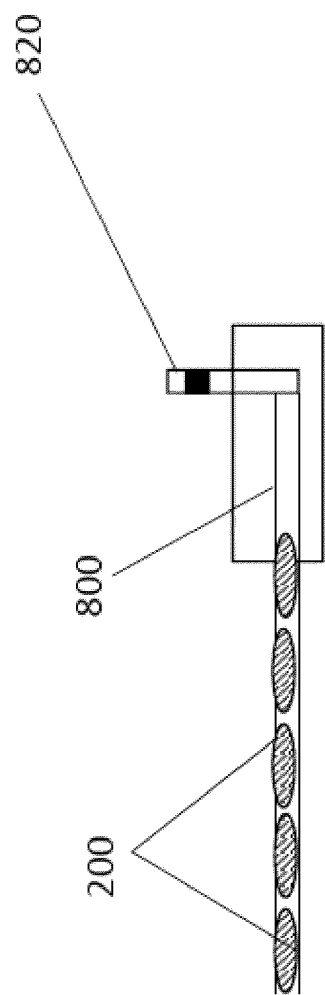
FIG. 27 is an illustration showing how multiple samples may be handled using the novel sample holder.

FIG. 27 is an illustration showing how multiple samples may be handled using the novel sample holder. Because of the large throw (25 mm in this lateral dimension), multiple biological samples may be loaded on the sample holder simultaneously. In FIG. 27, five samples 810 are shown loaded on to the sample holder 800. Using the lateral actuator, each of these samples can successively be brought in to the plane of the line foci and imaged. Accordingly, Multiple biological samples may be imaged without moving any other structure with in the light sheet microscope. No optics, no detector, no fluidics, no imaging systems need to be moved. As a result, the conditions under which successive images are taken as nearly as is possible, identical. This allows for particularly easy and straightforward automated or robotic operation.

The light sheet microscope may be made by machining and anodizing aluminum, using a combination of publicly available lenses, lasers, optical elements such as turning mirrors, movable stages, stepper and continuous motors, for example, in addition to custom parts. The detector may be a charge coupled device (CCD) camera readily available from a variety of sources. The device may be calibrated and focused using standard procedures in microscopy, and by imaging materials with known attributes, such as glass beads. The images may be displayed on monitors on the machine or remotely over the Internet, for example.

Among all the afore described independent motions, the light sheet focal plane always stays in the same position however, within the cuvette and with respect to the system. The detection locks to this excitation focal plane.

Accordingly, a light sheet microscope for imaging a biological sample is described.

The light sheet microscope may include at least two collimated light sources each emitting a beam of light along at least two different propagation axes, at least two optical subassemblies which focus the at least two beams of light into at least two straight lines, wherein at least one of the two straight lines defines a non-orthogonal angle with respect to its propagation axis and wherein the at least two straight lines are substantially overlapping, and wherein the straight lines and the propagation axes define an excitation plane of the light sheet microscope.

The light sheet microscope may further comprise a detector with imaging optics having a focal plane, wherein the imaging optics form an image of the focal plane on the detector, wherein a biological sample is disposed in the focal plane, and the focal plane is coplanar with the excitation plane. It may also include a sample holder holding the biological sample, wherein the sample holder is disposed at least partially in the focal plane and the biological sample is disposed in the excitation plane and the focal plane. The sample holder may be movable in the z-direction, orthogonal to the focal plane.

The sample holder may be moved in z-direction orthogonal to the focal plane to image a different region of the sample within a depth of the biological sample. The at least two beams may illuminate the biological sample in an alternating manner or sequential manner. the non-orthogonal angle may less than 40 degrees, as defined relative to the orthogonal axis. Alternatively, the non-orthogonal angle may be between about 5 and about 25 degrees, as defined relative to the orthogonal axis. In other embodiments, the non-orthogonal angle may be about 16 degrees, as defined relative to the orthogonal axis. At least three optical subassemblies may focus at least three beams of light into at least three straight lines and wherein the at least three straight lines are substantially overlapping. The three overlapping lines may be moved laterally in a sequence by moving the movable optical assembly laterally, but wherein the overlapping lines remain in the focal plane.

The three beams of light may all impinge on the biological sample from a laterally adjacent side of the biological sample. The at least two beams of light may comprises six beams of light, where three of the beams of light impinge on the biological sample from each of two laterally adjacent obverse sides. The collimated light source may comprises at least three collimated light sources.

The microscope may further comprise a movable optical assembly which in turn comprises at least one optical sub-assembly, wherein the at least one optical sub-assembly comprises beam shaping elements, wherein the beam shaping elements include at least one anamorphic lens and two spherical lenses, and wherein these beam shaping elements focus the at least one beam of light into at least on a line focus that is tilted with respect to the propagation axis.

The anamorphic lens may comprise a cylindrical lens, and the cylindrical lens may be disposed between the two spherical lenses, wherein one of the two spherical lenses is tilted with respect to the propagation axis of movable assembly by an angle of about 16 degrees.

The movable optical assembly may include three optical sub-assemblies, each of which focus a separate beam of light into a line focus, wherein the three line foci from the three optical subassemblies substantially overlap.

The light sheet microscope of any of the claims 16-17, wherein the lenses are arranged such that a first spherical lens is followed by the line focusing cylindrical lens which is followed by a second spherical lens which are arranged along the propagation axis, and wherein the second spherical lens is tilted at an angle of 16 degrees with respect to the orthogonal to the propagation axis, and wherein the lenses are separated by a lateral distance of less than about 10 mm. The movable optical assembly containing the at least one optical sub-assembly may be movable laterally in a plane such that the overlapping line foci also move laterally in a plane, and this lateral movement which defines the focal plane, and wherein the line foci all fall within the focal plane. The collimated light sources may have at least two different colors. The at least two different colors may be generated by a white light source and a filter wheel, wherein the position of the filter wheel defines the wavelength of the collimated source. The at least two different colors may be generated by at least two collimated sources, which are combined in a fiber optic cable and delivered from the fiber optic cable to the movable optical assembly. The at least two colors may include at least two of 488, 515, 553, 591, 640, and 785 nm.

The light sheet microscope may further include a pixelated detector with an optical axis, wherein the optical axis of the detector is disposed substantially orthogonal to the focal plane. The biological sample may be disposed in the focal plane. The biological sample may include compounds that are tagged with a fluorescent moiety, such that the moiety fluoresces when irradiated by the collimated sources. The fluorescence is detected by a pixelated detector, and wherein the pixelated detector is a charge coupled device (CCD) or CMOS camera. The pixelated detector may be coupled to a computer, and wherein the computer renders images for each position of the three overlapping lines based on signal from the pixelated detector.

The light sheet microscope may further comprise turning mirrors which redirect a collimated beam from a source, onto the optical axes of the optical subassembly. The turning mirrors may be disposed such that the beams travel parallel paths on entering the movable optical assembly, such that the movable optical assembly may be translated laterally without changing the line focus. The light sheet microscope may further comprise a second cylindrical lens upstream of movable optical assembly configured to enable magnification of the line focus.

While various details have been described in conjunction with the exemplary implementations outlined above, various alternatives, modifications, variations, improvements, and/or substantial equivalents, whether known or that are or may be presently unforeseen, may become apparent upon reviewing the foregoing disclosure. Accordingly, the exemplary implementations set forth above, are intended to be illustrative, not limiting.

What is claimed is:

1. A light sheet microscope for imaging a biological sample, comprising:
   at least three beams of collimated light propagating along at least three different propagation axes;
   a moveable optical assembly comprising at least three optical subassemblies which focus the at least three beams of light into three line foci forming at least three straight lines, wherein at least one of the three straight lines defines a non-orthogonal angle with respect to its propagation axis and wherein the at least three straight lines are substantially overlapping, and wherein the straight lines and the propagation axes define an excitation plane of the light sheet microscope, and wherein the three substantially overlapping lines are moved laterally in a sequence by moving the movable optical assembly laterally, but wherein the substantially overlapping lines remain in the excitation plane.

2. The light sheet microscope of claim 1, further comprising:
   a detector with imaging optics having a focal plane, wherein the imaging optics form an image of the focal plane on the detector, wherein a biological sample is disposed in the focal plane, and the focal plane is coplanar with the excitation plane.

3. The light sheet microscope for imaging biological samples of claim 1, further comprising:
   a sample holder holding the biological sample, wherein the sample holder is disposed at least partially in the focal plane and the biological sample is disposed in the excitation plane and the focal plane.

4. The light sheet microscope of claim 1, wherein the sample holder is movable in the z-direction, orthogonal to the focal plane.

5. The light sheet microscope of claim 1, wherein the sample holder is moved in z-direction orthogonal to the focal plane to image a different region of the biological sample within a depth of the biological sample.

6. The light sheet microscope of claim 1, wherein the at least two beams illuminate the biological sample in an alternating manner or sequential manner.

7. The light sheet microscope of claim 1, wherein the non-orthogonal angle is less than 40 degrees.

8. The light sheet microscope of claim 1, wherein the non-orthogonal angle is between about 5 and about 25 degrees.

9. The light sheet microscope of claim 1, wherein the three beams of light all impinge on the biological sample from a laterally adjacent side of the biological sample.

10. The light sheet microscope of claim 1, wherein the at least two beams of light comprises six beams of light, where three of the beams of light impinge on the biological sample from each of two laterally adjacent obverse sides.

11. The light sheet microscope of claim 1, wherein the collimated light source comprises at least three collimated light sources.

12. The light sheet microscope of claim 1, further comprising a pixelated detector with an optical axis, wherein the optical axis of the detector is disposed substantially orthogonal to the focal plane.

13. The light sheet microscope of claim 1, further comprising turning mirrors which redirect a collimated beam from a source, onto the optical axes of the optical subassembly.

14. A light sheet microscope for imaging a biological sample, comprising:
   at least two collimated light sources each emitting a beam of light along at least two different propagation axes;
   at least two optical subassemblies which focus the at least two beams of light into line foci forming at least two straight lines, wherein at least one of the two straight lines defines a non-orthogonal angle with respect to its propagation axis and wherein the at least two straight lines are substantially overlapping, and wherein the straight lines and the propagation axes define an excitation plane of the light sheet microscope, further comprising a moveable optical assembly which in turn comprises at least one optical sub-assembly, wherein the at least one optical sub-assembly comprises beam shaping elements, wherein the beam shaping elements include at least one anamorphic lens and two spherical lenses, and wherein these beam shaping elements focus at least a third beam of light into at least a line focues that is tilted with respect to the propagation axis.

15. The light sheet microscope of claim 14, wherein the beam shaping elements are arranged such that a first spherical lens is followed by the cylindrical lens which is followed by a second spherical lens which are arranged along the propagation axis, and wherein the second spherical lens is tilted at an angle of 16 degrees with respect to an orthogonal to the propagation axis, and wherein the lenses are separated by a lateral distance of less than about 10 mm.

16. The light sheet microscope of claim 14, wherein the movable optical assembly containing the at least one optical sub-assembly is movable laterally in a plane such that the overlapping line foci also move laterally in a plane, and the lateral defines the focal plane, and wherein the line foci all fall within the focal plane.

17. A light sheet microscope for imaging a biological sample, comprising:
at least two collimated light sources each emitting a beam of light along at least two different propagation axes;
at least two optical subassemblies which focus the at least two beams of light into line foci forming at least two straight lines, wherein at least one of the two straight lines defines a non-orthogonal angle with respect to its propagation axis and wherein the at least two straight lines are substantially overlapping, and wherein the straight lines and the propagation axes define an excitation plane of the light sheet microscope, further comprising a movable optical assembly which in turn comprises at least one optical sub-assembly, wherein the at least one optical sub-assembly comprises beam shaping elements, wherein the beam shaping elements include at least one anamorphic lens and two spherical lenses, and wherein these beam shaping elements focus at least a third beam of light into at least a line focus that is tilted with respect to the propagation axis, wherein the three line foci from the three optical subassemblies substantially overlap.

* * * * *